(12) United States Patent
Morrison et al.

(10) Patent No.: US 10,878,577 B2
(45) Date of Patent: Dec. 29, 2020

(54) METHOD, SYSTEM AND APPARATUS FOR SEGMENTING AN IMAGE OF A SCENE

(71) Applicant: CANON KABUSHIKI KAISHA, Tokyo (JP)

(72) Inventors: Paul William Morrison, Erskine Park (AU); James Austin Besley, Killara (AU)

(73) Assignee: Canon Kabushiki Kaisha, Tokyo (JP)

(*) Notice: Subject to any disclaimer, the term of this patent is extended or adjusted under 35 U.S.C. 154(b) by 109 days.

(21) Appl. No.: 16/221,337

(22) Filed: Dec. 14, 2018

(65) Prior Publication Data
US 2020/0193611 A1   Jun. 18, 2020

(51) Int. Cl.
| | |
|---|---|
| G06T 7/194 | (2017.01) |
| G06T 7/254 | (2017.01) |
| G06T 7/292 | (2017.01) |
| G06T 7/215 | (2017.01) |
| G06T 7/246 | (2017.01) |
| G06T 7/174 | (2017.01) |

(Continued)

(52) U.S. Cl.
CPC .......... *G06T 7/194* (2017.01); *G06K 9/00771* (2013.01); *G06T 7/11* (2017.01); *G06T 7/174* (2017.01); *G06T 7/215* (2017.01); *G06T 7/248* (2017.01); *G06T 7/251* (2017.01); *G06T 7/254* (2017.01); *G06T 7/292* (2017.01); *G06T 2207/20084* (2013.01); *G06T 2207/30221* (2013.01)

(58) Field of Classification Search
CPC ......... G06T 7/194; G06T 7/254; G06T 7/292; G06T 7/215; G06T 7/248; G06T 7/174; G06T 7/11; G06T 7/251; G06T 2207/20084; G06T 2207/30221; G06K 9/00771

See application file for complete search history.

(56) References Cited

U.S. PATENT DOCUMENTS

| | | | |
|---|---|---|---|
| 6,798,897 B1 * | 9/2004 | Rosenberg | ................ G06T 7/33 348/154 |
| 6,812,846 B2 | 11/2004 | Gutta | |
| 7,512,250 B2 | 3/2009 | Lim | |

(Continued)

OTHER PUBLICATIONS

Raul Diaz; Detecting Dynamic Objects with Multi-View Background Substraction;In The IEEE International Conference on Computer Vision (ICCV), Dec. 2013; pp. 1-12.

(Continued)

*Primary Examiner* — John B Strege
(74) *Attorney, Agent, or Firm* — Canon U.S.A., Inc. IP Division

(57) ABSTRACT

A method of segmenting an image of a scene captured using one of a plurality of cameras in a network. A mask of an image of a scene captured by a first one of said cameras is received. A set of pixels in the mask likely to be in a foreground of an image captured by a second one of said cameras is determined based on the received mask, calibration information, and a geometry of the scene. A set of background pixels for the second camera is generated based on the determined set of pixels. The generated set of background pixels is transmitted to the second camera. The image of the scene captured by the second camera is segmented using the transmitted background pixels.

11 Claims, 16 Drawing Sheets

(51) Int. Cl.
    *G06T 7/11*        (2017.01)
    *G06K 9/00*        (2006.01)

(56)            References Cited

U.S. PATENT DOCUMENTS

| | | | |
|---|---|---|---|
| 7,916,944 B2 | 3/2011 | Yang | |
| 8,625,897 B2 * | 1/2014 | Criminisi | G06T 7/11 |
| | | | 382/173 |
| 2004/0005084 A1 * | 1/2004 | Kondo | H04N 19/17 |
| | | | 382/107 |
| 2007/0031037 A1 * | 2/2007 | Blake | G06T 7/194 |
| | | | 382/173 |
| 2014/0307056 A1 * | 10/2014 | Collet Romea | G06K 9/38 |
| | | | 348/47 |
| 2014/0368661 A1 * | 12/2014 | Angot | G06T 7/11 |
| | | | 348/164 |
| 2015/0063697 A1 * | 3/2015 | Jumpasut | G06T 7/194 |
| | | | 382/173 |
| 2015/0319424 A1 | 11/2015 | Haimovitch-Yogev | |
| 2016/0125626 A1 * | 5/2016 | Wang | G06T 11/005 |
| | | | 348/47 |
| 2018/0293774 A1 * | 10/2018 | Yu | G06T 15/04 |
| 2020/0020149 A1 * | 1/2020 | Moltaji | G06T 7/90 |

OTHER PUBLICATIONS

Yuri Ivanov; Fast Lighting Independent Background Subtraction; International Journal of Computer Vision; Jun. 2000, 37, pp. 199-207.

* cited by examiner

METHOD, SYSTEM AND APPARATUS FOR SEGMENTING AN IMAGE OF A SCENE

TECHNICAL FIELD

The present invention relates generally to the field of image segmentation and, in particular, to a method, apparatus and system for segmenting an image of a scene in a multi-camera system. The present invention also relates to a computer program product including a computer readable medium having recorded thereon a computer program for segmenting an image of a scene.

BACKGROUND

A multi-camera system comprises multiple cameras at different poses, viewing the same scene. A multi-camera system may be used for such tasks as three dimensional (3D) scene reconstruction, depth measurement, and constructing a synthetic view of the scene at a novel virtual camera pose. In such tasks, image segmentation may be an important pre-processing step. For example, in constructing a synthetic view of the scene, it is beneficial to first isolate the pixels in each camera image that belong to the foreground objects of the scene, as opposed to the background of the scene. The segmentation of an image into foreground and background pixels may be referred to as "image segmentation", or "foreground/background segmentation".

Two broad categories of image segmentation methods are semantic segmentation and background subtraction. Semantic segmentation methods attempt to learn features that capture the semantic meaning of different parts of an image, and a mapping from the features to the foreground/background segmentation of the image. An example of a semantic segmentation method is a Convolutional Neural Network (CNN) architecture known as a U-Net. The CNN is trained with a large dataset of images, and corresponding known segmentation masks. The U-Net architecture comprises an encoder network that learns to generate semantic features of an input image, and a decoder network, that learns to produce the output segmentation mask. An advantage of semantic segmentation methods such as U-Net is that the semantic segmentation methods produce accurate segmentation masks given a single image, and are tolerant toward static foreground objects or changing backgrounds. A disadvantage of semantic segmentation methods is that the methods often label an excess of pixels as "foreground", particularly when the separation between foreground and background is detailed.

Background subtraction methods attempt to model the background pixels in a scene, from a particular viewpoint of a camera. A background model is maintained over a sequence of images captured by a camera. For a given captured image, the foreground pixels are identified as the pixels that differ substantially from the current background model. The background model is subsequently updated using the pixels from the captured image, to be used for the segmentation of subsequent captured images. A common background modelling method is the Gaussian Mixture Model (GMM), in which each pixel in the background model is modelled as a mixture of Gaussian distributions. An advantage of background subtraction methods is that the background subtraction methods perform segmentation for each pixel in isolation, which results in very detailed segmentation masks. A disadvantage of background subtraction methods is that, if a foreground object is stationary, the obscured background pixels behind the foreground object may change unknowingly, resulting in an inaccurate segmentation. Other disadvantages of background subtraction methods include the possibility of stationary foreground objects becoming part of the background model, and moving background objects being deemed foreground.

Conventional multi-camera background subtraction methods address some of the above disadvantages. In particular, if scene geometry is known, as well as the camera poses and intrinsic parameters, the pixels captured by one camera can be "projected" to the image plane of another camera, using conventional methods. The projected pixels may then be used to form a background to allow accurate segmentation of stationary foreground objects. However, the conventional methods may not be suitable for real time systems, and the the conventional methods may be inaccurate depending on the camera arrangement and the scene content.

Further, there are trends in multi-camera systems of increasing numbers of cameras, increasing image resolution, and increasing frame rate. The increasing numbers of cameras result in ever-increasing amounts of data being transferred from each camera to a central server, and between cameras (for multi-camera background subtraction). The increasing numbers of cameras also increases the cost of multi-camera systems, and places constraints on system performance and features.

SUMMARY

It is an object of the present invention to substantially overcome, or at least ameliorate, one or more disadvantages of existing arrangements.

According to one aspect of the present disclosure, there is provided a method of segmenting an image of a scene captured using one of a plurality of cameras in a network, the method comprising:
  receiving a mask of an image of a scene captured by a first one of said cameras;
  determining a set of pixels in the mask likely to be in a foreground of an image captured by a second one of said cameras based on the received mask, calibration information, and a geometry of the scene;
  generating a set of background pixels for the second camera based on the determined set of pixels;
  transmitting the generated set of background pixels to the second camera; and
  segmenting the image of the scene captured by the second camera using the transmitted background pixels.

According to another aspect of the present disclosure, there is provided a system for segmenting an image of a scene captured using one of a plurality of cameras in a network, the system comprising:
  a memory for storing data and a computer program;
  a processor coupled to the memory for executing the computer program, the program comprising instructions for:
  receiving a mask of an image of a scene captured by a first one of said cameras;
  determining a set of pixels in the mask likely to be in a foreground of an image captured by a second one of said cameras based on the received mask, calibration information, and a geometry of the scene;
  generating a set of background pixels for the second camera based on the determined set of pixels;
  transmitting the generated set of background pixels to the second camera; and segmenting the image of the scene captured by the second camera using the transmitted background pixels.

According to still another aspect of the present disclosure, there is provided an apparatus for segmenting an image of a scene captured using one of a plurality of cameras in a network, the apparatus comprising:
- means for receiving a mask of an image of a scene captured by a first one of said cameras;
- means for determining a set of pixels in the mask likely to be in a foreground of an image captured by a second one of said cameras based on the received mask, calibration information, and a geometry of the scene;
- means for generating a set of background pixels for the second camera based on the determined set of pixels;
- means for transmitting the generated set of background pixels to the second camera; and
- means for segmenting the image of the scene captured by the second camera using the transmitted background pixels.

According to still another aspect of the present disclosure, there is provided a non-transitory computer readable medium for segmenting an image of a scene captured using one of a plurality of cameras in a network, the program comprising:
- code for receiving a mask of an image of a scene captured by a first one of said cameras;
- code for determining a set of pixels in the mask likely to be in a foreground of an image captured by a second one of said cameras based on the received mask, calibration information, and a geometry of the scene;
- code for generating a set of background pixels for the second camera based on the determined set of pixels;
- code for transmitting the generated set of background pixels to the second camera; and
- code for segmenting the image of the scene captured by the second camera using the transmitted background pixels.

According to still another aspect of the present disclosure, there is provided a method of segmenting an image of a scene captured using a camera in a network of cameras, the method comprising:
- receiving a foreground mask of a first image of a scene obtained from a first one of said cameras based on an initial segmentation of the first image;
- receiving a first background mask of a second image of the scene obtained from a second camera and a second background mask of a third image of the scene obtained from a third camera;
- transforming background pixels generated using the received first background mask and the received second background mask to an image plane of the first camera based on a transformation between the image plane of the first camera and image planes of the second camera and the third camera; and
- segmenting the first image based on a modified initial segmentation of the first image, the initial segmentation being modified based on a comparison between foreground pixels generated using the received foreground mask of the first image and a weighted combination of the transformed background pixels weighted according to a similarity measure derived from the first camera, the second camera and the third camera.

According to still another aspect of the present disclosure, there is provided a system for segmenting an image of a scene captured using a camera in a network of cameras, the system comprising:
- a memory for storing data and a computer program;
- a processor coupled to the memory for executing the computer program, the program comprising instructions for:
  - receiving a foreground mask of a first image of a scene obtained from a first one of said cameras based on an initial segmentation of the first image;
  - receiving a first background mask of a second image of the scene obtained from a second camera and a second background mask of a third image of the scene obtained from a third camera;
  - transforming background pixels generated using the received first background mask and the received second background mask to an image plane of the first camera based on a transformation between the image plane of the first camera and image planes of the second camera and the third camera; and
  - segmenting the first image based on a modified initial segmentation of the first image, the initial segmentation being modified based on a comparison between foreground pixels generated using the received foreground mask of the first image and a weighted combination of the transformed background pixels weighted according to a similarity measure derived from the first camera, the second camera and the third camera.

According to still another aspect of the present disclosure, there is provided an apparatus for segmenting an image of a scene captured using a camera in a network of cameras, the apparatus comprising:
- means for receiving a foreground mask of a first image of a scene obtained from a first one of said cameras based on an initial segmentation of the first image;
- means for receiving a first background mask of a second image of the scene obtained from a second camera and a second background mask of a third image of the scene obtained from a third camera;
- means for transforming background pixels generated using the received first background mask and the received second background mask to an image plane of the first camera based on a transformation between the image plane of the first camera and image planes of the second camera and the third camera; and
- means for segmenting the first image based on a modified initial segmentation of the first image, the initial segmentation being modified based on a comparison between foreground pixels generated using the received foreground mask of the first image and a weighted combination of the transformed background pixels weighted according to a similarity measure derived from the first camera, the second camera and the third camera.

According to still another aspect of the present disclosure, there is provided a non-transitory computer readable medium for segmenting an image of a scene captured using a camera in a network of cameras, the program comprising:
- code for receiving a foreground mask of a first image of a scene obtained from a first one of said cameras based on an initial segmentation of the first image;
- code for receiving a first background mask of a second image of the scene obtained from a second camera and a second background mask of a third image of the scene obtained from a third camera;
- code for transforming background pixels generated using the received first background mask and the received second background mask to an image plane of the first camera based on a transformation between the image plane of the first camera and image planes of the second camera and the third camera; and code for segmenting the first image based on a modified initial segmentation of the first image, the initial segmentation being modified based on a comparison between foreground pixels generated using the received foreground mask of the first image and a weighted combination of the transformed background pixels weighted according to a similarity measure derived from the first camera, the second camera and the third camera.

Other aspects of the invention are also disclosed.

BRIEF DESCRIPTION OF THE DRAWINGS

One or more embodiments of the invention will now be described by way of example with reference to the following drawings, in which.

DETAILED DESCRIPTION INCLUDING BEST MODE

Figure 1:
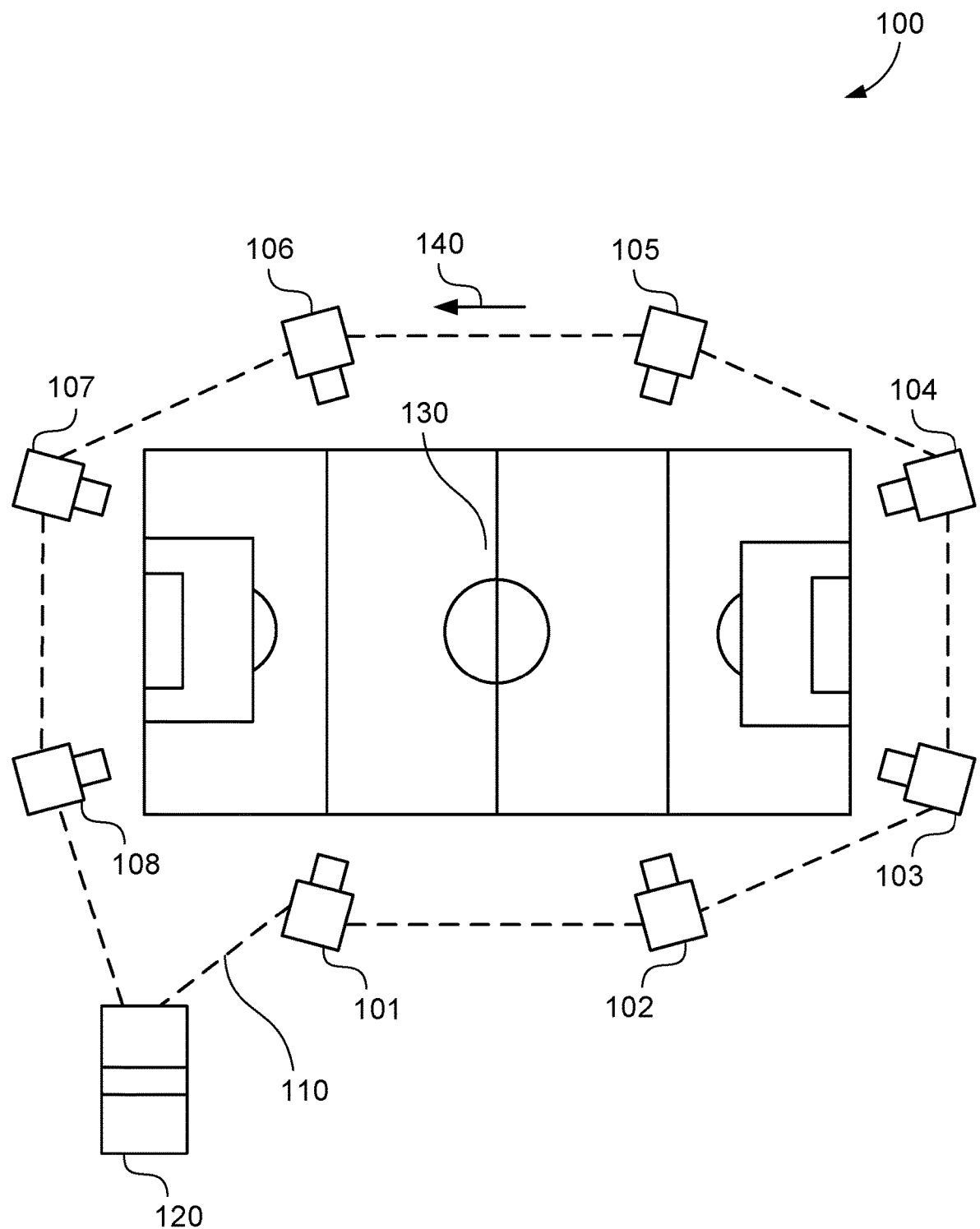
FIG. 1 shows an example of a multi-camera system.

FIG. 1 shows an example of a multi-camera system 100. The multi-camera system 100 includes eight camera sub-systems 101-108, which capture and process images of a scene 130. The scene 130 may, for example, be a sporting event or a musical performance, or some other kind of event. The processing performed by the camera sub-systems 101-108 includes image segmentation and, in particular, foreground/background segmentation.

The camera sub-systems 101-108 are connected to each other, and to a central server 120, via a network 110, depicted in FIG. 1 by dashed lines. The network 110 provides a means for the camera sub-systems 101-108 to communicate information with each other, and with the central server 120. The network 110 may be a wired network such as an Ethernet or optical fibre-based network, or a wireless network such as Wi-Fi. The central server 120 processes images and other information transmitted by the camera sub-systems 101-1-08. For example, the central server 120 may create a 3D model of the scene 130, or create novel images from the point-of-view of a virtual camera.

When there are large number of camera sub-systems 101-108, each capturing images at a high resolution (e.g. 4096×2160 pixels), and at high frame rates (e.g. 60 frames per seconds), a very large amount of information needs to be transmitted on the network 110. It is desirable that the amount of information be reduced, to minimise the cost of the network 110 and improve reliability. Other restrictions may apply to the network 110, such as the direction of information flow. For example, information (e.g., captured images and segmentation masks) may be required to flow in one direction, such as direction 140.

Methods of segmenting a captured image in a multi-camera system, such as multi-camera system 100, will be described below. Image segmentation may be performed by each camera sub-system 101-108. Segmentation accuracy may be improved through the communication of information between camera sub-systems 101-108 via the network 110. Due to the restrictions described previously, the additional segmentation information is minimised. The described methods improves segmentation accuracy through the communication of information between camera sub-systems 101-108, while also minimising impact on the bandwidth of the network 120. The communication of background pixels is used to improve segmentation accuracy, where the background is obscured by foreground objects.

The cameras within a multi-camera system, such as multi-camera system 100, are typically calibrated, such that the poses and intrinsic parameters of the cameras are known. Pose and intrinsic parameters may be used for performing tasks such as 3D scene reconstruction and novel viewpoint generation. Pose and intrinsic parameters may be pre-determined using any suitable method. The 3D geometry of the background of a scene may be determined, such as the plane representing the ground of the scene 130. In the methods described below, pre-determined pose, intrinsic parameters, and background geometry may be used to project captured image positions from one camera sub-system to another, so that background pixels can be selected for transmission.

Figure 2A:
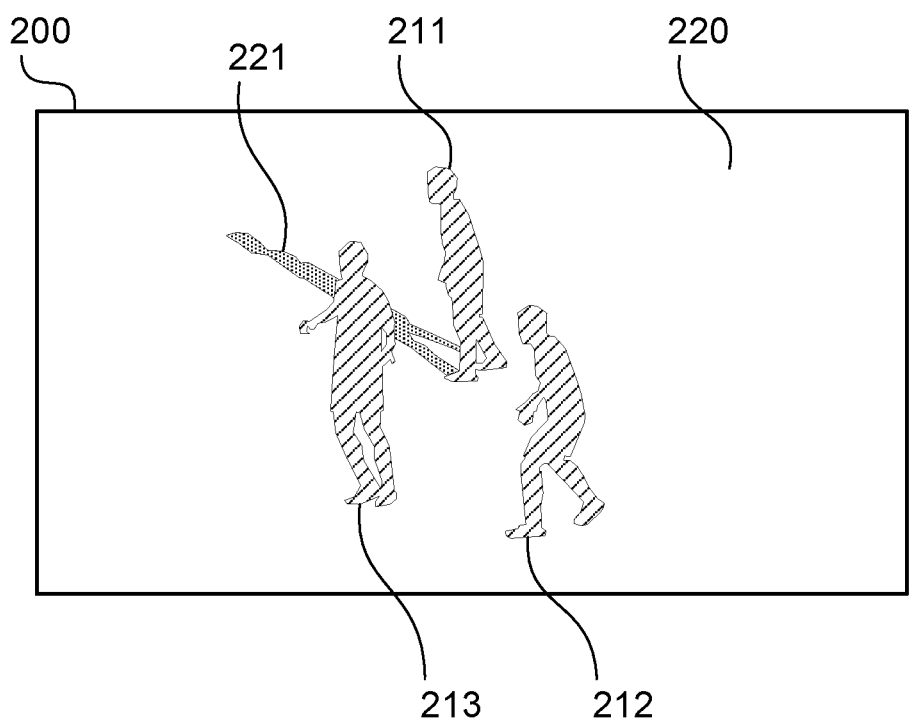
FIG. 2A shows an example of a captured image.
Figure 2B:
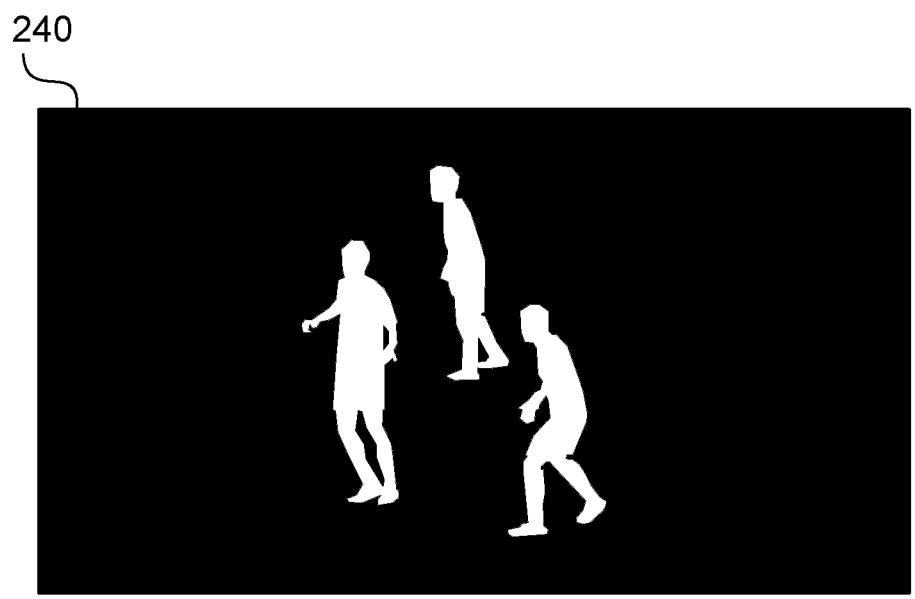
FIG. 2B shows a segmentation mask formed by segmenting the image of FIG. 2A, as performed by a camera sub-system within the multi-camera system of FIG. 1.

An example of image segmentation is shown in FIGS. 2A and 2B. A captured image 200 as seen in FIG. 2A has been captured by a camera sub-system, such as camera sub-system 101. The captured image 200 includes three people 211-213, a ground region 220, and a shadow 221 of person 211. The task of image segmentation, and in particular foreground/background segmentation, is to identify those pixels of the captured image 200 that depict the foreground, as opposed to those pixels that depict the background. In the present disclosure, foreground objects include people 211-213, and the background includes other object types, such as ground 220 and shadow 221. In other scenarios, foreground objects may comprise different object types, or a wider variety of object types.

The result of image segmentation is a segmentation mask. An example of a segmentation mask 240 is shown in FIG. 2B, as a result of segmenting captured image 200. The segmentation mask 240 marks pixels belonging to people 211-213 as "white", indicating that the pixels marked white are foreground pixels. Other pixels in the segmentation mask 240 have been marked "black", indicating that the pixels marked blacked are background pixels. The marked pixels include the pixels belonging to the ground 220 and the shadow 221. The segmentation mask 240 may also be referred to as a 'foreground mask'.

The methods described below produce accurate image segmentation in a multi-camera system. Further, the described methods address the problem of multi-camera segmentation where the available network bandwidth is restricted, such as when there are a large number of high-resolution cameras operating at high frame rates.

The described methods incorporate background information from multiple cameras in a background model, which is used for segmenting images captured by a particular camera. The background model may also be referred to as a 'background mask'. The appearance of the background often differs, depending on the viewing angle, background surface properties, lighting, camera exposure properties, and other factors. The described methods select which background pixels to transmit and include in the background model, so that only the most relevant background information is included. The selection results in improved segmentation accuracy. The selection also results in reduced transmission of background pixels across the network (e.g., the network 110), which minimises impact on bandwidth of the network.

Figure 15A:
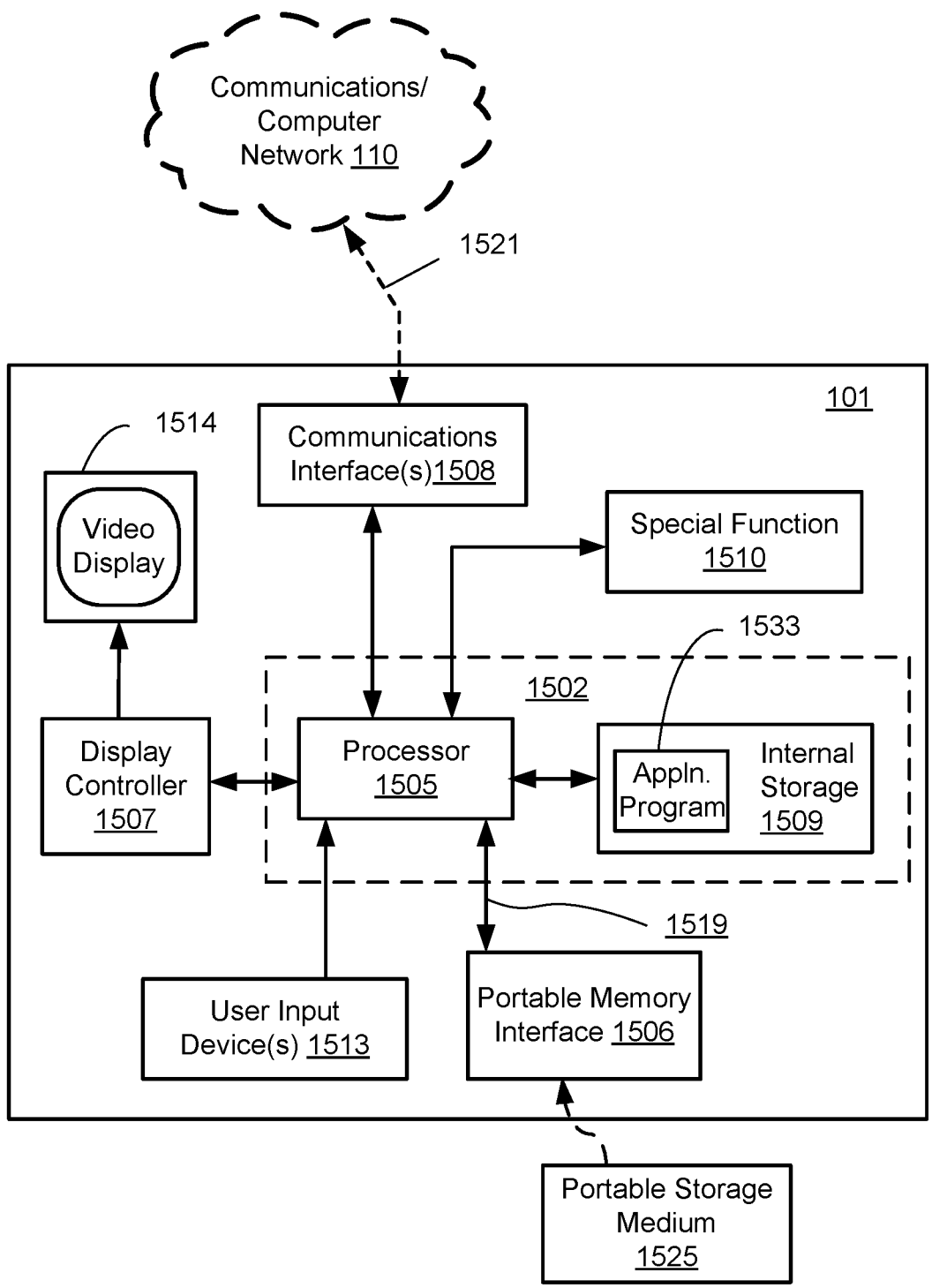
FIGS. 15A and 15B collectively form a schematic block diagram representation of a camera sub-system of the multi-camera system of FIG. 1.
Figure 15B:
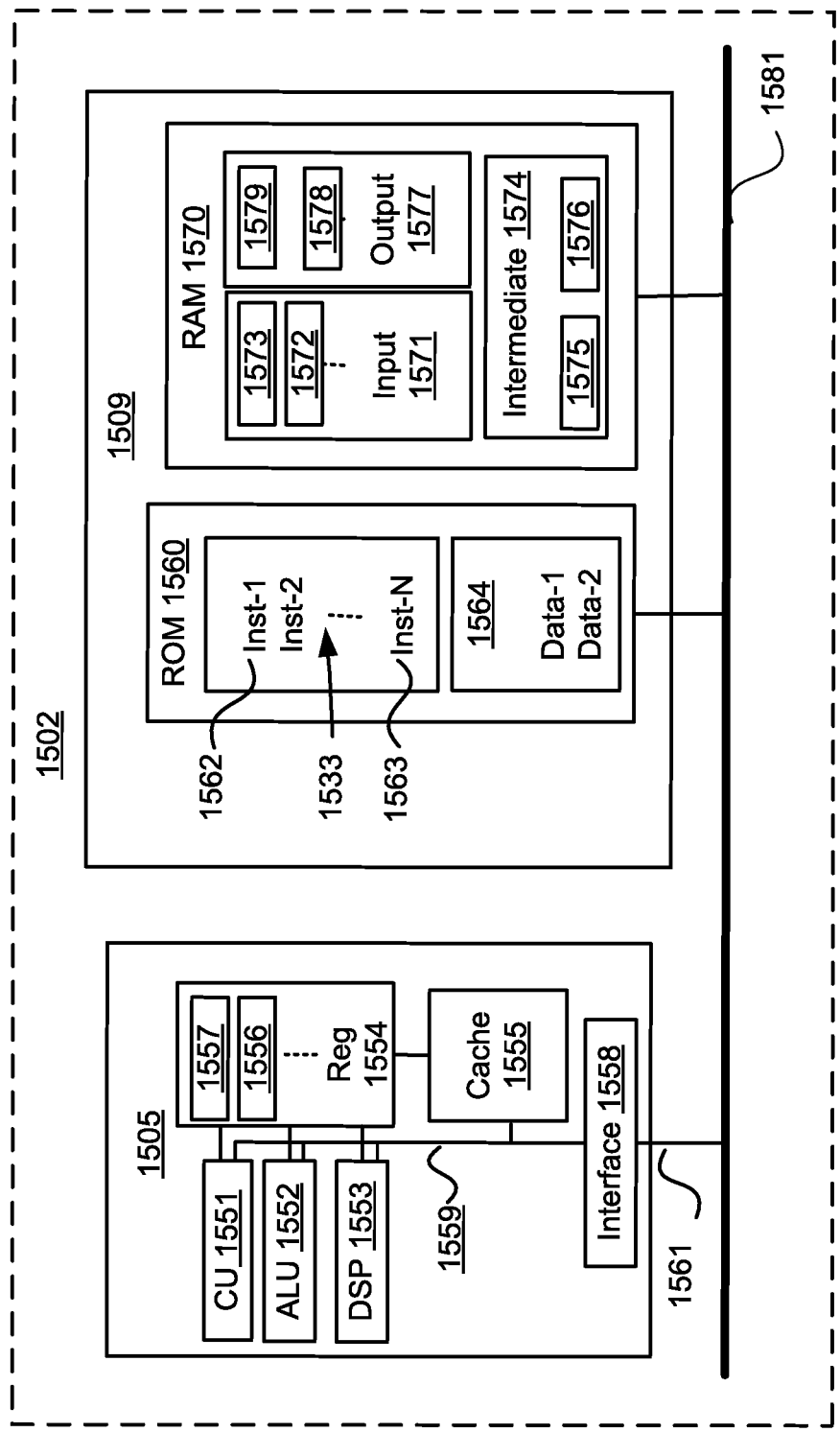

FIGS. 15A and 15B collectively form a schematic block diagram of the camera sub-system 101, upon which one or more steps of the segmentation methods to be described are desirably practiced. The camera sub-systems 102-108 have the same configuration as the camera sub-system 101 as represented in FIGS. 15A and 15B. The processing resources of the camera sub-systems 101-108 are limited. Nevertheless, the steps of the described methods performed by the camera sub-systems may also be performed on higher-level devices such as desktop computers, server computers, and other such devices with significantly larger processing resources.

As seen in FIG. 15A, the camera 101 comprises an embedded controller 1502. Accordingly, the camera 101 may be referred to as an "embedded device." In the present example, the controller 1502 has a processing unit (or processor) 1505 which is bi-directionally coupled to an internal storage module 1509. The storage module 1509 may be formed from non-volatile semiconductor read only memory (ROM) 1560 and semiconductor random access memory (RAM) 1570, as seen in FIG. 15B. The RAM 1570 may be volatile, non-volatile or a combination of volatile and non-volatile memory.

The camera 101 includes a display controller 1507, which is connected to a video display 1514, such as a liquid crystal display (LCD) panel or the like. The display controller 1507 is configured for displaying graphical images on the video display 1514 in accordance with instructions received from the embedded controller 1502, to which the display controller 1507 is connected.

The camera 101 also includes user input devices 1513 which are typically formed by keys, a keypad or like controls. In some implementations, the user input devices 1513 may include a touch sensitive panel physically associated with the display 1514 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 15A, the camera 1501 also comprises a portable memory interface 1506, which is coupled to the processor 1505 via a connection 1519. The portable memory interface 1506 allows a complementary portable memory device 1525 to be coupled to the electronic device 1501 to act as a source or destination of data or to supplement the internal storage module 1509. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1501 also has a communications interface 1508 to permit coupling of the device 1501 to the network 110 via a connection 1521. The connection 1521 may be wired or wireless. For example, the connection 1521 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The embedded controller 1502, possibly in conjunction with further special function components 1510, perform the functions of the camera 101. The components 1510 represent a lens, focus control and image sensor of the camera 101. The special function components 1510 is connected to the embedded controller 1502. The components 1510 may also comprise components required for communications in a cellular telephone environment. The components 1510 may also comprise a number of encoders and decoders of a type including Joint Photographic Experts Group (JPEG), (Moving Picture Experts Group) MPEG, MPEG-1 Audio Layer 3 (MP3), and the like.

The described methods may be implemented using the embedded controller 1502, where one or more steps of the processes of FIGS. 4, 6, 7 and 8 may be implemented as one or more software application programs 1533 executable within the embedded controller 1502. The camera 101 of FIG. 15A implements one or more steps of the described methods. In particular, with reference to FIG. 15B, one or more steps of the described methods are effected by instructions in the software 1533 that are carried out within the controller 1502. The software instructions may be formed as one or more code modules, each for performing one or more particular tasks. The software may also be divided into two separate parts, in which a first part and the corresponding code modules performs one or more steps of the described methods and a second part and the corresponding code modules manage a user interface between the first part and the user.

The software 1533 of the embedded controller 1502 is typically stored in the non-volatile ROM 1560 of the internal storage module 1509. The software 1533 stored in the ROM 1560 can be updated when required from a computer readable medium. The software 1533 can be loaded into and executed by the processor 1505. In some instances, the processor 1505 may execute software instructions that are located in RAM 1570. Software instructions may be loaded into the RAM 1570 by the processor 1505 initiating a copy of one or more code modules from ROM 1560 into RAM 1570. Alternatively, the software instructions of one or more code modules may be pre-installed in a non-volatile region of RAM 1570 by a manufacturer. After one or more code modules have been located in RAM 1570, the processor 1505 may execute software instructions of the one or more code modules.

The application program 1533 may be pre-installed and stored in the ROM 1560 by a manufacturer, prior to distribution of the camera 101. However, in some instances, the application programs 1533 may be supplied to the user encoded on one or more CD-ROM (not shown) and read via the portable memory interface 1506 of FIG. 15A prior to storage in the internal storage module 1509 or in the portable memory 1525. In another alternative, the software application program 1533 may be read by the processor 1505 from the network 110, or loaded into the controller 1502 or the portable storage medium 1525 from other computer readable media. Computer readable storage media refers to any non-transitory tangible storage medium that participates in providing instructions and/or data to the controller 1502 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1501. Examples of transitory or non-tangible computer readable transmission media that may also participate in the provision of software, application programs, instructions and/or data to the camera 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1533 and the corresponding code modules mentioned above may be executed to implement one or more graphical user interfaces (GUIs) to be rendered or otherwise represented upon the display 1514 of FIG. 15A. Through manipulation of the user input device 1513 (e.g., the keypad), a user of the camera 101 and the application programs 1533 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 15B illustrates in detail the embedded controller 1502 having the processor 1505 for executing the application programs 1533 and the internal storage 1509. The internal storage 1509 comprises read only memory (ROM) 1560 and random access memory (RAM) 1570. The processor 1505 is able to execute the application programs 1533 stored in one or both of the connected memories 1560 and 1570. When the camera 101 is initially powered up, a system program resident in the ROM 1560 is executed. The application program 1533 permanently stored in the ROM 1560 is sometimes referred to as "firmware". Execution of the firmware by the processor 1505 may fulfil various functions, including processor management, memory management, device management, storage management and user interface.

The processor 1505 typically includes a number of functional modules including a control unit (CU) 1551, an arithmetic logic unit (ALU) 1552 and a local or internal memory comprising a set of registers 1554 which typically contain atomic data elements 1556, 1557, along with internal buffer or cache memory 1555. One or more internal buses 1559 interconnect these functional modules. The processor 1505 typically also has one or more interfaces 1558 for communicating with external devices via system bus 1581, using a connection 1561.

The application program 1533 includes a sequence of instructions 1562 though 1563 that may include conditional branch and loop instructions. The program 1533 may also include data, which is used in execution of the program 1533. The data may be stored as part of the instruction or in a separate location 1564 within the ROM 1560 or RAM 1570.

In general, the processor 1505 is given a set of instructions, which are executed therein. This set of instructions may be organised into blocks, which perform specific tasks or handle specific events that occur in the camera 101. Typically, the application program 1533 waits for events and subsequently executes the block of code associated with that event. Events may be triggered in response to input from a user, via the user input devices 1513 of FIG. 15A, as detected by the processor 1505. Events may also be triggered in response to other sensors and interfaces in the camera 101.

The execution of a set of the instructions may require numeric variables to be read and modified. Such numeric variables are stored in the RAM 1570. The disclosed method uses input variables 1571 that are stored in known locations 1572, 1573 in the memory 1570. The input variables 1571 are processed to produce output variables 1577 that are stored in known locations 1578, 1579 in the memory 1570.

Intermediate variables 1574 may be stored in additional memory locations in locations 1575, 1576 of the memory 1570. Alternatively, some intermediate variables may only exist in the registers 1554 of the processor 1505.

The execution of a sequence of instructions is achieved in the processor 1505 by repeated application of a fetch-execute cycle. The control unit 1551 of the processor 1505 maintains a register called the program counter, which contains the address in ROM 1560 or RAM 1570 of the next instruction to be executed. At the start of the fetch execute cycle, the contents of the memory address indexed by the program counter is loaded into the control unit 1551. The instruction thus loaded controls the subsequent operation of the processor 1505, causing for example, data to be loaded from ROM memory 1560 into processor registers 1554, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

One or more steps or sub-process in the processes of the methods described below is associated with one or more segments of the application program 1533, and is performed by repeated execution of a fetch-execute cycle in the processor 1505 or similar programmatic operation of other independent processor blocks in the camera 101.

Figure 3:
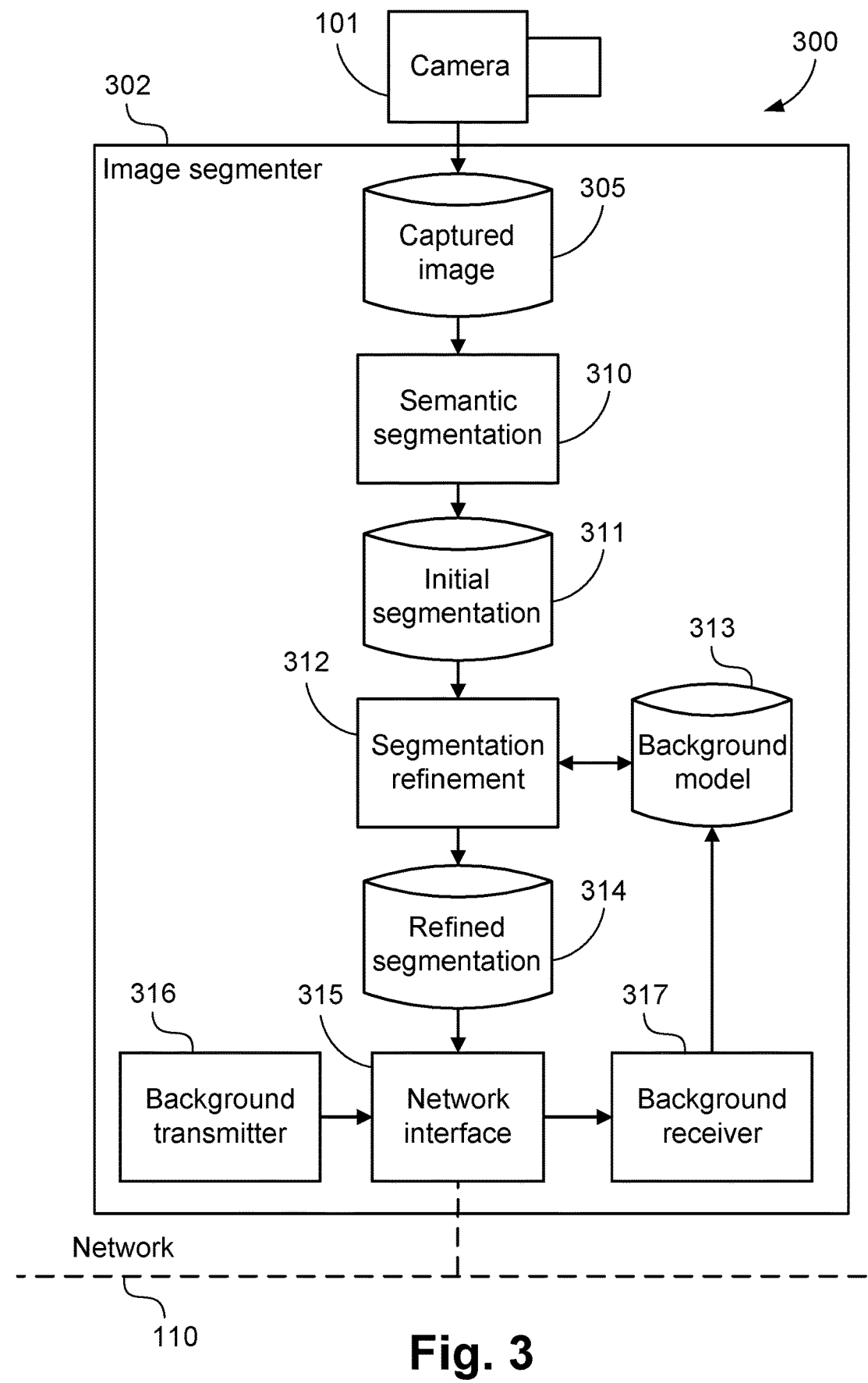
FIG. 3 is a schematic block diagram showing the software architecture of a camera sub-system of FIG. 1.

A block diagram depicting the software architecture 300 of the camera sub-system 101 (which also applies to camera sub-systems 102-108), is shown in FIG. 3. The camera sub-system 101 captures images of the scene 130, performs image segmentation, and transmits the captured images and segmentation masks to the central server 120 via the network 110.

The camera 101 comprises a camera module 301 for capturing images 305 of the scene 130, and provides the captured images 305 to an image segmenter 302. The image segmenter 302 includes a semantic segmentation module 310 that produces an initial segmentation 311. The semantic segmentation module 310 may comprise a Convolutional Neural Network (CNN), such as the U-Net architecture. A CNN segmentation method generally produces an accurate segmentation, but may not produce a pixel-perfect segmentation. Therefore, the architecture 300 uses a CNN to produce an initial segmentation 311, that is subsequently refined by the segmentation refinement module 312. An example of an initial segmentation is described below with reference to FIG. 10.

The segmentation refinement module 312 makes pixel-level adjustments to the initial segmentation 311, in order to produce a more accurate, refined segmentation 314. In one arrangement, the segmentation refinement module 312 employs a background subtraction method of image segmentation, which makes use of a background model 313 of one of the images 305 of the scene (e.g., the scene 130) captured by the camera 101. The background model 313 represents the current knowledge of the background appearance of the scene, at each pixel of the captured image 305. It is used by the segmentation refinement module 312 to refine the initial segmentation 311, and it is subsequently updated by the segmentation refinement module 312 and the background receiver 317 to represent the most relevant background information. The segmentation refinement module 312 is described in more detail with reference to FIG. 4, and an example of an image segmentation is described with reference to FIGS. 12A and 12B.

The refined segmentation 314 is an accurate foreground/background segmentation of the captured image 305 provided by the camera 101. The refined segmentation 314 is transmitted to the central server 120 by network interface module 315, via the network 110. The network interface module 315 also transmits parts of the captured image 305 to the central server 120, based on the refined segmentation 314. The refined segmentation 314 may be encoded within the transmitted parts of the captured image 305. The refined segmentation 314 does not need to be transmitted separately to the captured image 305. The refined segmentation may be referred to as a 'foreground segmentation'.

In one arrangement, the background model 313 comprises a single image, where each pixel represents the known background appearance at the corresponding position in the captured image 305. Each pixel in the background model 313 is updated as a new background appearance is determined. The new background appearance is determined using the captured image 305, and the background pixels transmitted to the camera sub-system 101 from other camera sub-systems. Other forms of background model 313 may also be used. For example, a Gaussian Mixture Model, which represents the background of each pixel in the captured image with a mixture of Gaussian distributions. The described methods can accommodate many forms of background model.

The described methods addresses the problems of the prior art by including background pixels in the background model 313 that are obscured by foreground objects in the captured image 305. A background transmitter module 316 determines which background pixels of the captured image 305 are potentially useful for other camera sub-systems to perform segmentation refinement. As described in more detail below, the background transmitter module 316 is used for determining a set of pixels in the background model 313 likely to be a foreground of an image captured by another of the camera sub-systems 102-108 based on the background model 313, calibration parameter information, and a geometry of the scene. The background transmitter module 316 is used for generating a set of background pixels for at least one of the other camera sub-systems 102-108 based on the set of pixels determined to likely be in the foreground of an image captured by the other camera. The background transmitter module 316 is used for transmitting the determined background pixels to the other camera sub-systems using network interface module 315, via the network 110. The background transmitter module 316 is described in more detail with reference to FIG. 7, and an example is described with reference to FIGS. 13A, 13B and 13C.

The network interface module 315 also receives background pixels transmitted to the camera sub-system 101 by other camera sub-systems. The received background pixels are processed by background receiver module 317. The background receiver module 317 selects the received background pixels to include in the background model 313, for use by the segmentation refinement module 312. As described in detail below, the segmentation refinement module 312 may be used for segmenting an image 305 of the scene 130 captured by at least one of the other camera sub-systems (e.g., 102-108) using the received background pixels. The background receiver module 317 is described in more detail with reference to FIG. 8, and an example is described with reference to FIGS. 11A, 11B and 11C.

In one example arrangement, the image 305 of a scene 130 captured using one of the plurality of camera sub-systems 101 in the network 100 is segmented. A background mask (e.g., 313) of the image 305 of the scene 130 captured by the camera 101 is received by the segmentation refinement module 312. A set of pixels in the background mask likely to be in a foreground of an image captured by a second one of the cameras (e.g., 102) is determined based on the received mask, calibration information, and a geometry of the scene 130. The segmentation refinement module 312 may be use for generating a set of background pixels for the second camera based on the determined set of pixels. The background transmitter module is then used for transmitting the generated set of background pixels to the second camera 102. As described in detail below, the image of the scene captured by the second camera 102 is segmented using the transmitted background pixels.

In another example arrangement, the image 305 of the scene 130 captured using the camera 101 in the network 100 of calibrated cameras may be segmented based on a foreground mask of the image 305 of the scene. The foreground mask of the image 305 may be obtained from the camera 101 by the segmentation refinement module 312 based on an initial segmentation of the image 305. In such an example arrangement, a first background mask (e.g., 313) of a second image of the scene 130 is obtained from a second camera (e.g., 102) and a second background mask of a third image of the scene 130 is obtained from a third camera (e.g., 103). The segmentation refinement module 312 is then used for transforming background pixels generated using the received first background mask and the received second background mask to an image plane of the first camera 101 based on a transformation between the image plane of the first camera 101 and image planes of the second camera 102 and the third camera 103. The The segmentation refinement module 312 is then used for segmenting the image 305 based on a modified or refined initial segmentation of the image 305. As described in detail below, the initial segmentation may be modified based on a comparison between foreground pixels generated using the received foreground mask of the image 305 and a weighted combination of the transformed background pixels weighted according to a similarity measure derived from the first camera 101, the second camera 102 and the third camera 103.

The modules 310, 312, 315, 316 and 317 of the image segmenter 302 may be implemented by one or more software code modules of the software application program 1533 resident in the hard disk drive 1510 and being controlled in execution by the processor 1505.

Figure 4:
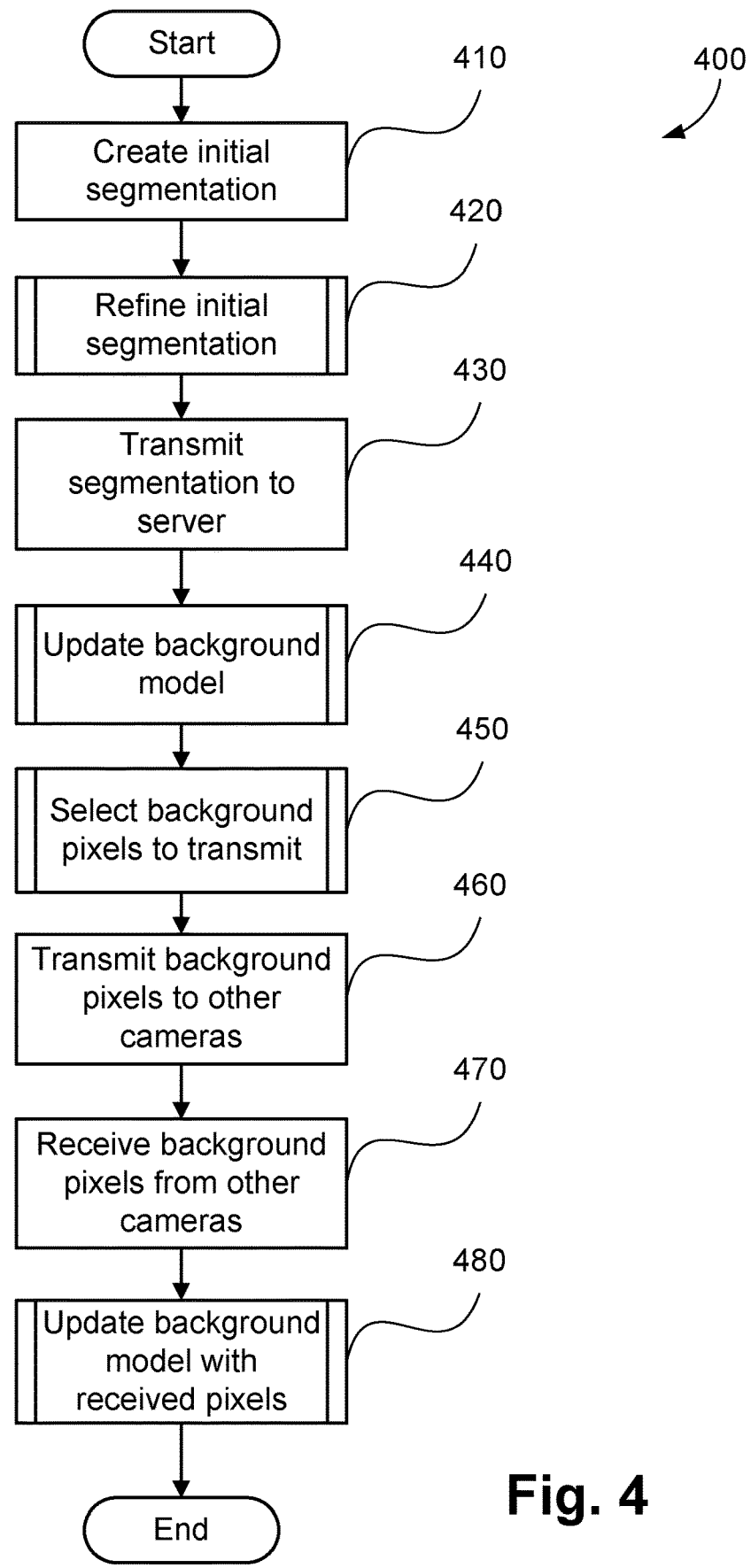
FIG. 4 is a schematic flow diagram showing a method of segmenting a captured image, as performed by the camera sub-system of FIG. 3.

The method 400 of segmenting a captured image 305 will now be described with reference to FIG. 4. The method 400 will be described by way of example with reference to the camera 101. The steps of the method 400 are performed by the modules 310, 312, 315, 316 and 317 of the image segmenter 302, as described below. The method 400 is similarly executed by the camera sub-systems 101-108 of the system 100.

The method 400 starts at creating step 410, where an initial segmentation 311 of the captured image 305 is created by the semantic segmentation module 310 under execution of the processor 1505. As described previously, in one arrangement, the semantic segmentation component 310 comprises a CNN, which has previously been trained using appropriate training data. The CNN may be trained using appropriate training data using any suitable method. At step 410, the captured image 305 is input to the CNN, and the initial segmentation 311 is output. The initial segmentation determined at step 410 may be referred to as a 'foreground mask'. The initial segmentation determined at step 410 may be stored in the memory 1506.

The method 400 then proceeds to refining step 420, where the initial segmentation 311 is refined by the segmentation refinement module 312 under execution of the processor 1505. As described previously, the segmentation refinement module 312 produces a refined segmentation 314 that is more accurate than the initial segmentation 311. The refined segmentation determined at step 420 may be stored in the memory 1506. A method 500 of refining a segmentation, as executed at step 420, will be described in more detail below with reference to FIG. 5.

The method 400 then proceeds to transmitting step 430, where the refined segmentation 314 and parts of the captured image 305 are transmitted to the central server 120 by the network interface module 315 under execution of the processor 1505. Following step 430, the method 400 proceeds to updating step 440, where the segmentation refinement component module 312, under execution of the processor 1505, updates the background model 313. At step 440, the background model 313 is updated using the background pixels in the captured image 305 that is currently being segmented. A method 600 of updating the background model 313, as executed at step 440, will be described in more detail below with reference to FIG. 6.

The method 400 then proceeds to selecting step 450, where the background transmitter module 316 under execution of the processor 1505 selects the background pixels in the captured image 305 to transmit to other camera sub-systems (e.g., camera sub-systems 102-108). The selected background pixels may be used by other camera sub-systems to update the background models of the other camera systems, thereby improving the accuracy of the refined segmentation masks determined by the other camera systems. A method 700 of selecting the background pixels to transmit, as executed at step 450, will be described in more detail below with reference to FIG. 7. Following step 450 the method 400 proceeds to transmitting step 460, where the selected background pixels are transmitted by the network interface module 315 via the network 110. In one arrangement, the selected background pixels may be transmitted at a lower resolution for one or more image frames.

The method 400 then proceeds to receiving step 470, where the network interface module 315, under execution of the processor 1505, receives background pixels from the other camera sub-systems 102-108 in the network 110. The background pixels received by the network interface module 315 are the pixels selected by the other camera sub-systems 102-108 as potentially being useful. In particular, the received background pixels are located at pixels obscured by foreground objects in the captured image 305. The method 400 then proceeds to updating step 480, where the received background pixels are used by the background receiver module 317 to update the background model 313. A method 800 of updating the background model 313 with the received background pixels, as executed at step 480, will be described in more detail below with reference to FIG. 8. The order of steps 410-480 described above is only an example. In other arrangements, for example, steps 470 and 480 of receiving background pixels and updating the background model may be executed by the image segmenter module 302 prior to step 420 of refining the initial segmentation.

Figure 5:
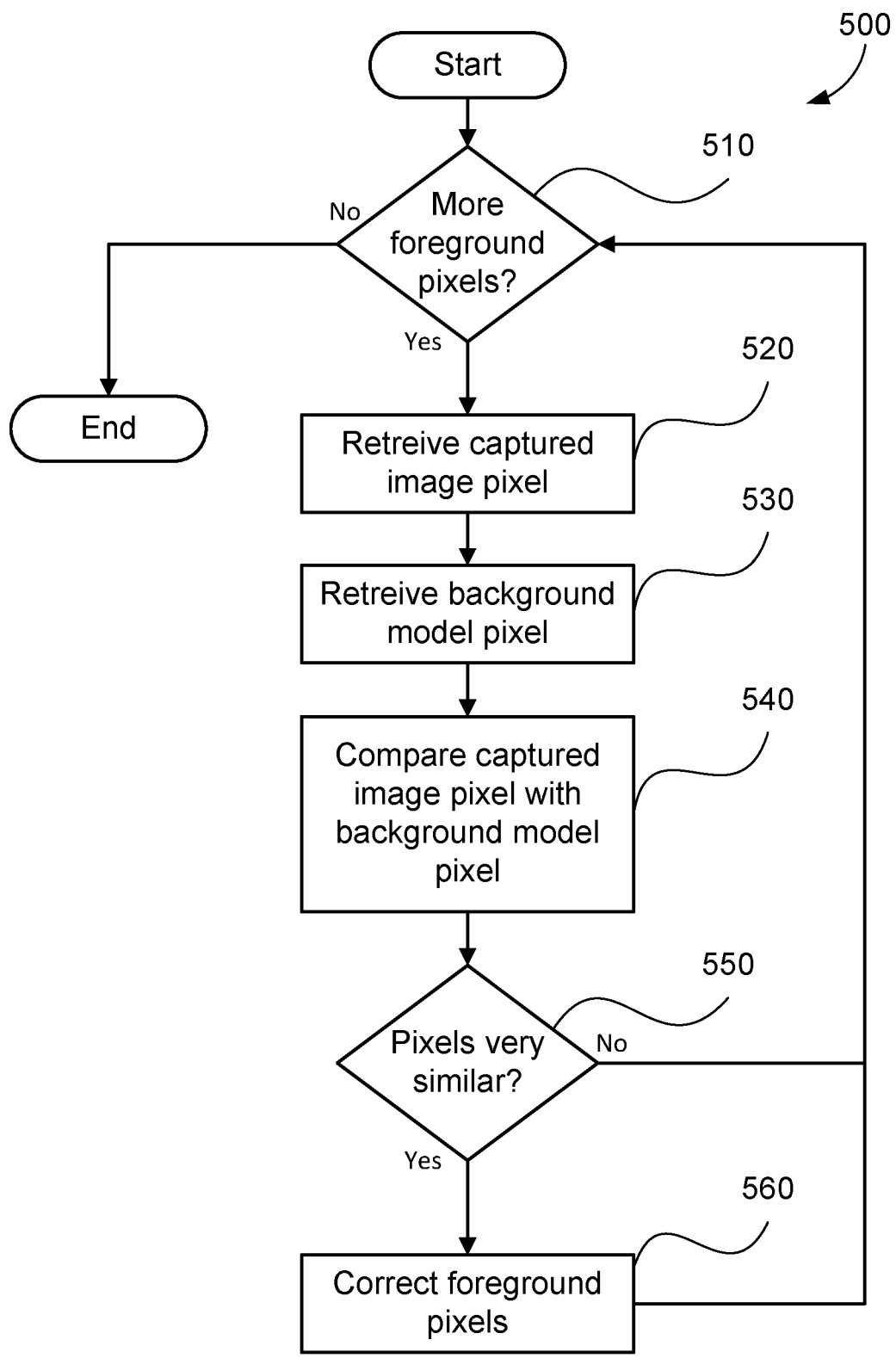
FIG. 5 is a schematic flow diagram showing a method of refining a segmentation, as used in the method of FIG. 4.

The method 500 of refining the segmentation 311, as performed by the segmentation refinement module 311 at step 420, will now be described with reference to FIG. 5. The segmentation refinement method 500 analyses pixels of the captured image 305 that have been marked as "foreground" in the initial segmentation 311, and re-classifies the foreground pixels as "background" if the pixels are very similar to corresponding pixels in the background model 313. The method 500 is effective when the initial segmentation tends to classify more background pixels as foreground than the method 500 classifies foreground pixels as background. The background model 313 may comprise a single image containing the most recent known background pixels.

As described above, the segmentation refinement module 311 may be implemented by one or more software code modules of the software application program 1533 resident in the hard disk drive 1510 and being controlled in execution by the processor 1505.

The method 500 starts at decision step 510, where if there are more foreground pixels in the initial segmentation 311 remaining to be processed, then the method 500 proceeds to retrieving step 520. Otherwise, the method 500 concludes.

At step 520, the captured pixel corresponding to the next foreground pixel is retrieved under execution of the processor 1505. The method 500 then proceeds to retrieving step 530, where the background model pixel corresponding to the next foreground pixel is retrieved. The background model pixel retrieved at step 530 represents the estimated background appearance at a current position within the captured image 305 and initial segmentation 311.

The method 500 then proceeds to comparing step 540, where the retrieved captured image pixel and retrieved background model pixel are compared the segmentation refinement module 311 under execution of the processor 1505. The Euclidean distance between the red, green and blue (RGB) colour values is determined at step 540 to compare the retrieved captured image pixel and retrieved background model pixel, However, other distances may be formed based on RGB or other colour spaces in order to compare the pixels at step 540.

The method 500 then proceeds to decision step 550, where the distance is used to determine if the pixels are similar. In one arrangement, if the distance is less than a pre-determined threshold, then the pixels are considered similar at step 550. Otherwise, the pixels are considered different. Using the Euclidean distance in RGB space, a threshold of 0.04 (i.e., with RGB values ranging from 0.0 to 1.0) may be used for the comparison at step 550.

If the captured image pixel is determined to be similar to the background model pixel, at step 550, the method 500 proceeds to correcting step 560. At step 560, the corresponding value of the initial segmentation 310 is corrected (i.e. changed from "foreground" to "background"), to form the corrected value within the refined segmentation 314. Upon completion of step 560, the method 500 returns to decision step 510.

However, if it is determined at step 550 that the captured image pixel is not similar to the background model pixel, then the method 500 returns to step 510 and the corresponding value of the initial segmentation 310 is not corrected. If the corresponding value of the initial segmentation 310 is not corrected then the corresponding value of the refined segmentation 314 remains the same as the initial segmentation 310. As described above, the refined segmentation may be stored in the memory 1506.

If there are no more foreground pixels to process at step 550, then the method 500 concludes. Following the completion of the method 500, the refined segmentation 314 will in general be a more accurate segmentation of the captured image 305 than the initial segmentation 311. An example of segmentation refinement will be described below with reference to FIGS. 12A and 12B.

In one arrangement, the method 500 only corrects pixels that are labelled "foreground" in the initial segmentation 311. In other arrangements, the segmentation refinement module 312 may also correct pixels that are labelled "background" in the initial segmentation 311. The pixels that are labelled "foreground" in the initial segmentation 311 may be corrected, for example, by comparing the "background" pixels of the captured image 305 to the corresponding values of the background model 313. The labelling of the corrected pixels may changed to "foreground" if the pixels are significantly different to the corresponding values of the background model.

Other implementations of the background model 313 may be used in the method 500. For example, the Gaussian Mixture Model may be used in the method 500 to compare the image pixels and the background model pixels.

In implementations that use the Gaussian Mixture Model, alternative methods of measuring the difference between pixel values may be used. For example, the probability of a pixel belonging to the background in a Gaussian Mixture Model may be determined to measure the difference between pixel values. Further, any suitable method of modelling the background may be used in the method 500.

Figure 6:
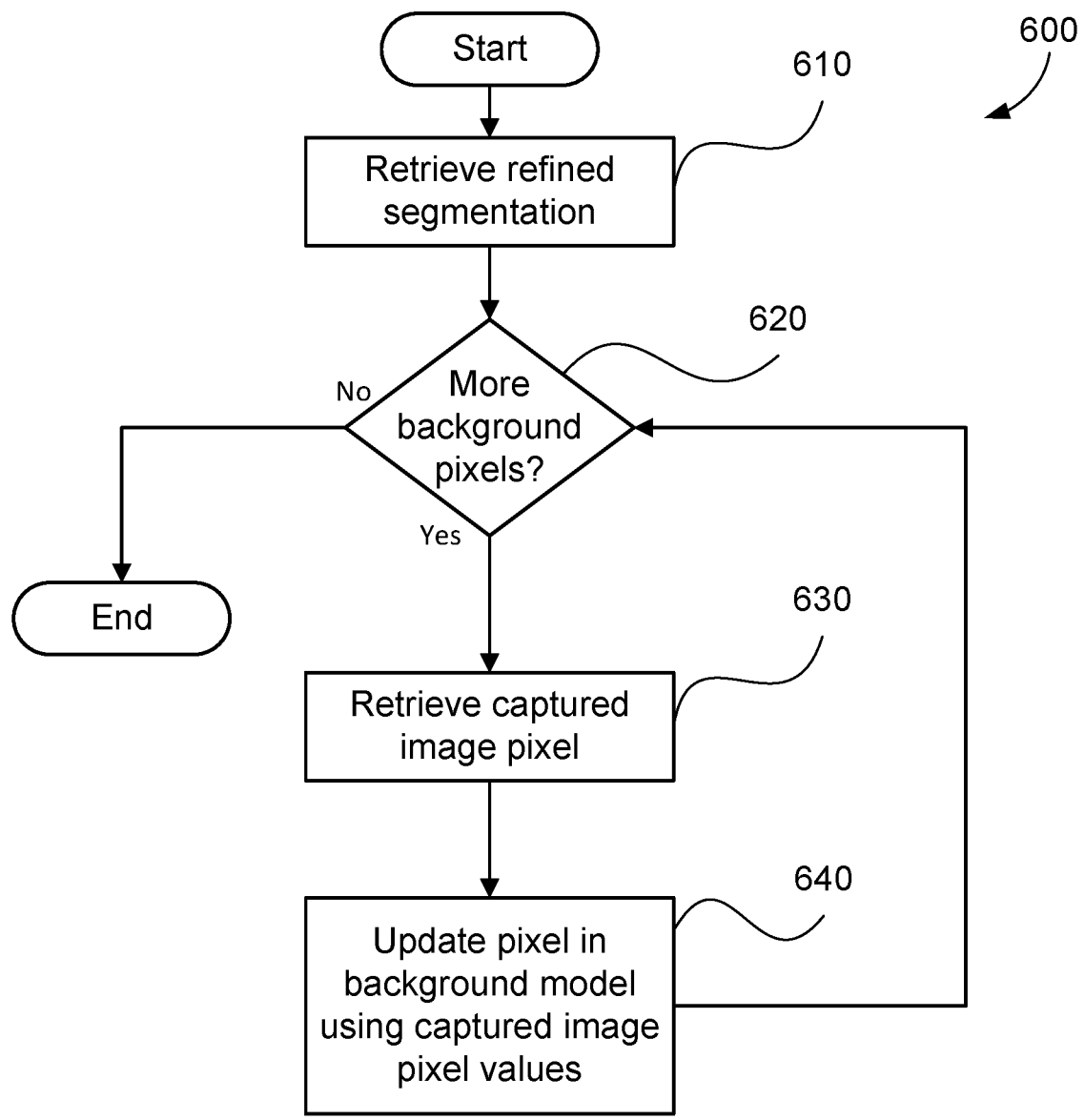
FIG. 6 is a schematic flow diagram showing a method of updating a background model, as used in the method of FIG. 4.

The method 600 of updating the background model 313, as performed by the segmentation refinement module 312, will now be described with reference to FIG. 6. The method 600 is executed at step 440 of the method 400. As described above, the segmentation refinement module 312 may be implemented by one or more software code modules of the software application program 1533 resident in the hard disk drive 1510 and being controlled in execution by the processor 1505.

The method 600 starts at retrieving step 610, where the refined segmentation 314 is retrieved under execution of the processor 1505. The refined segmentation was determined previously at step 420 of the method 400.

The method 600 then proceeds to decision step 620, where it is determined if there are more pixels in the refined segmentation that are labelled "background", and have not yet been processed. If it is determined at step 620 that there are more background pixels to process, then the method 600 proceeds to step 630, where the captured image pixel corresponding to the next background pixel is retrieved under execution of the processor 1505. The captured image pixel retrieved at step 630 represents the most recent known background appearance at the location of the captured image pixel.

The method 600 then proceeds to updating step 640, where the background model 313 is updated using the captured image pixel. The value of the captured image pixel in the captured image 305 is copied to the corresponding location in the background model 313. The captured image pixel is deemed to be "background", so the background model 313 is updated to represent the current knowledge of the background appearance. The background model 313 will subsequently be used for the processing of future captured images.

Upon completion of step 640, the method 600 returns to decision step 620. If, at decision step 620, it is determined that there are no more background pixels in the refined segmentation 314, the method 600 concludes. An example of updating the background model is described below with reference to FIGS. 11A, 11B and 11C.

If the implementation of the background model 313 is different, then the method 600 of updating the background model 313 may be different. For example, if the background model 313 comprises a Gaussian Mixture Model, then the Gaussian distribution and mixture parameters at each pixel of the background model 313 are updated using a different procedure. Many forms of background model may be used in the method 600.

Figure 7:
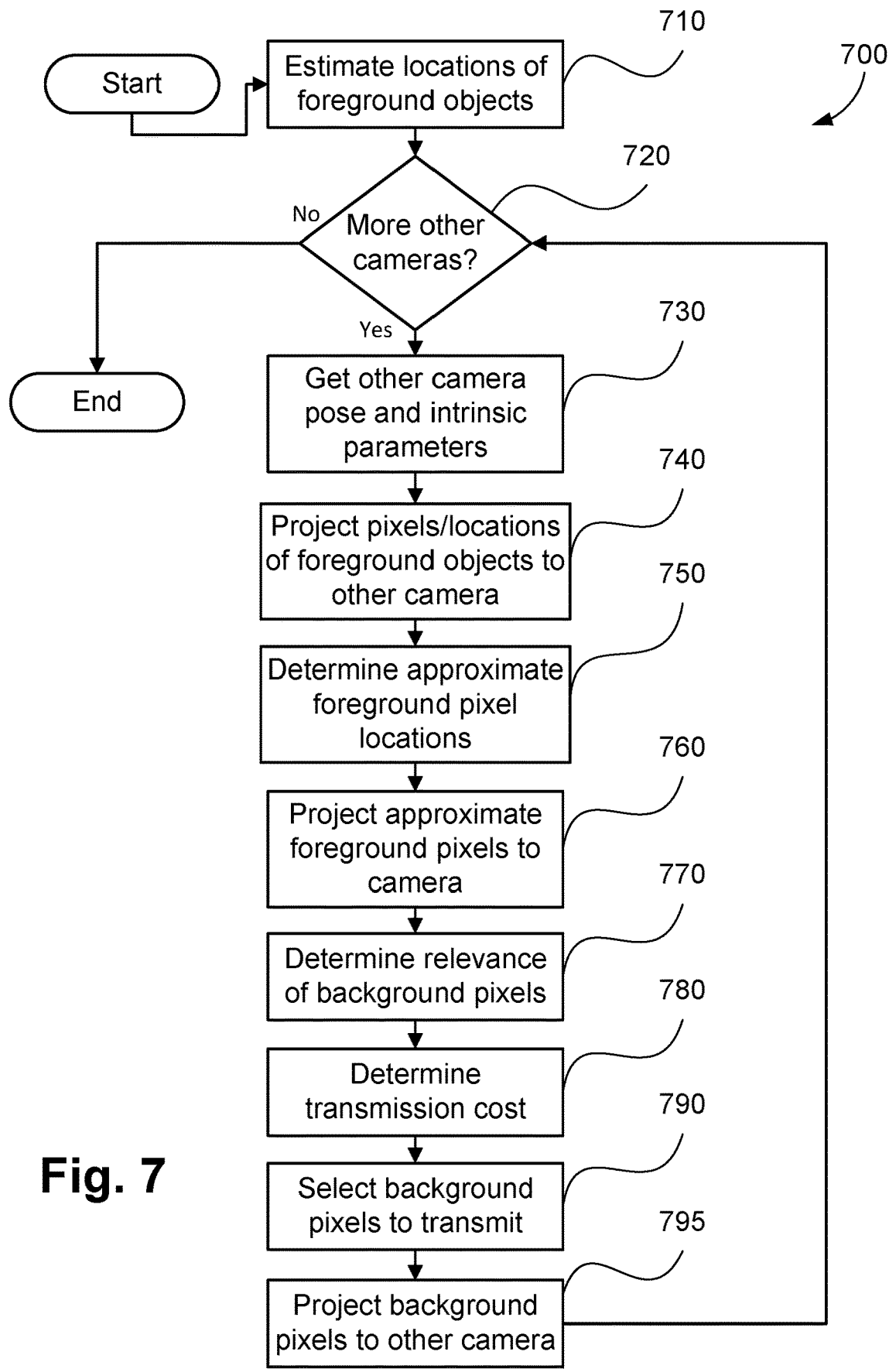
FIG. 7 is a schematic flow diagram showing a method of selecting background pixels to transmit to another camera sub-system, as used in the method of FIG. 4.

The method 700 of selecting the background pixels of a captured image 305 to transmit to another camera sub-system, as performed by the background transmitter module 316, will now be described with reference to FIG. 7. The method 700 is executed at step 450 of the method 400. The method 700 is used to select and transmit the background pixels that are likely to be useful for another camera sub-system (e.g., camera sub-systems 102-108), so that the camera sub-system can more accurately refine the segmentation of images captured by the camera sub-system.

The method 700 starts at determining step 710, where the locations of the foreground objects in the captured image 305 are determined under execution of the processor 1505. In one example application of the method 700, foreground objects comprise people, who are generally standing, walking, or running on the ground. The ground may be characterised by a known, pre-determined plane, which is a mathematical description of the position and orientation of the ground in 3D real-world space. The mathematical description of a plane in 3D space at step 710. The locations of the foreground objects specify the positions of the foreground objects in 3D space. Since the foreground objects are assumed to be on the ground, the locations of the foreground objects specify the positions of the foreground objects on the ground plane. An example of the locations of foreground objects is described below with reference to FIGS. 14A, 14B and 14C. In other applications, such as where foreground objects comprise other object types, the locations may be described differently. For example, the location of a ball that is moving through the air may be specified using 3D coordinates that are not aligned with a plane.

The method 700 then proceeds to decision step 720, where it is determined if there are more camera sub-systems to which the background transmitter module 316 needs to send background pixels. For example, the background transmitter module 316 may be required to send background pixels to only those other camera sub-systems that are within a pre-determined distance on the network, in order to minimise network bandwidth overheads. For example, it may only send background pixels to the next adjacent camera on the network 110.

If it is determined at step 720 that there are more camera sub-systems to which to send background pixels, then the method 700 proceeds to retrieving step 730, where the camera pose and intrinsic parameters of the next other camera sub-system are retrieved. The camera pose represents the position and orientation of a camera in 3D real-world space, and the intrinsic parameters represent the internal parameters of the imaging system of the camera, including a lens and sensor of the camera. Camera pose and intrinsic parameters allow two dimensional (2D) positions in a captured image 305 to be mapped to 3D positions in a scene with known geometry (such as the ground plane of a scene 130). Further, camera pose and intrinsic parameters allow 3D positions in a scene 130 to be mapped back to 2D positions in a captured image 305. By combining these steps, 2D positions in the captured image 305 of one camera sub-system can be mapped to 2D positions in the captured image 305 of another camera sub-system. The combination of steps is known as "projection" between cameras. Positions can be projected accurately between cameras if the camera poses and intrinsic parameters are known, and the 3D geometry of the scene 130 is also known. In the example application of the method 700, the 3D geometry of the scene 130 comprises the known ground plane, and vertical planes used to approximate the 3D geometry of foreground objects.

The method 700 then proceeds to projecting step 740, where the pixels belonging to the foreground objects are projected to the captured image 305 of the other camera sub-system currently being processed. The process of projecting points between the captured images of different camera sub-systems was described previously. The pixels of a foreground object are projected via a vertical plane that passes through the determined location of the foreground object. A plane is a two-dimensional planar (flat) surface in 3D space, that may be described mathematically by a 3D point that the plane intersects, and a normal vector of the plane. In the described methods, a plane is used to project the pixels of foreground objects from the image plane of one camera sub-system to the image plane of another camera sub-system. In one arrangement, a plane passes through the location of a respective foreground object on the ground, and is aligned with the main axis of the foreground object. In the example application, where foreground objects are people who are predominantly standing, walking, running, etc., a plane is vertical. In one arrangement, a plane is also angled between the two camera sub-systems, so that the foreground pixels can be projected with minimal error. In alternative arrangements, other geometric constructs, such as cylinders, can be used in the place of planes.

The projection of the pixels belonging to the foreground objects results in the pixels of the same foreground objects, from the point of view of the other camera sub-system. This allows the background transmitter module 316 to determine the approximate foreground locations of another camera sub-system. An example of the projection of pixels of foreground objects is described with reference to FIGS. 13A, 13B, 13C and 13D.

In an alternative arrangement, the determined locations of the foreground objects, determined at step 710, (i.e., rather than the pixels determined at step 740) are projected to the image plane of the other camera sub-system via the ground plane (i.e., rather than a vertical plane). An example of the projection of locations of foreground objects is described with reference to FIGS. 13A to 13D.

The method 700 then proceeds to determining step 750, where the approximate foreground pixel locations in the other camera sub-system are determined. The approximate foreground pixel locations are identified by the locations of the pixels projected at step 740. The projected foreground pixel locations may also be dilated, in order to account for errors in projection and the time between capturing an image, processing the image, and transmitting the background pixels between the camera sub-systems 101-108 via the network 110.

In an alternative arrangement, the approximate foreground pixel locations are determined using the projected locations of the foreground objects (i.e., using the ground plane). In the example application of the method 700, the foreground objects comprise people, the approximate foreground pixels at a particular projected location is determined by determining the size of a person, and defining a region of pixels in the captured image, at the projected location. The region of pixels may also be scaled appropriately, depending on the distance of the location from the camera sub-system 101 in 3D world coordinates. An example of determining approximate foreground pixel locations is described below with reference to FIGS. 14A, 14B, 14C and 14D. The approximate foreground pixel locations will partially determine the background pixels that are transmitted by the background transmitter module 316.

The method 700 then proceeds to projecting step 760, where the approximate foreground pixel locations are projected from the captured image of the other camera sub-system, back to the captured image 305 of the camera sub-system (e.g., 101) currently being processed. Step 760 is used to identify the locations of background pixels in the current captured image 305 that correspond to the foreground pixels of the other camera (e.g., 102), determined at step 750. In the example application, background pixels lie on the ground plane. Therefore, at step 760, the ground plane may be used to project the approximate foreground pixel locations, rather than the vertical plane that approximates the foreground geometry. The projection of approximate foreground pixel locations proceeds similarly to the previous projection of foreground object locations, using camera poses, intrinsic parameters, and the ground plane. The result of projection step 760 is the approximation of background pixels in the captured image 305 that correspond to approximate foreground pixels in the captured image of the other camera sub-system (e.g., 102). Examples of projecting approximate foreground pixel locations are described with reference to FIGS. 13A, 13B, 13C and FIGS. 14A, 14B and 14C.

The method 700 then proceeds to determining step 770, where the relevance of the background pixels (i.e., identified by the projected foreground pixels) is determined, under execution of the processor 1505. Background pixels are deemed relevant if the background pixels are similar to the corresponding background of the other camera sub-system (e.g., 102), and will therefore likely be useful in refining the segmentation at the other camera sub-system. In one arrangement, the similarity of backgrounds between camera sub-systems 101-108 is pre-determined, and may be based on a similarity metric such as correlation of background pixel colours at corresponding locations in the captured images. In other arrangements, relevance may be based on the similarity of the poses, intrinsic parameters, and exposure parameters to the two camera sub-systems (e.g., camera sub-system 101 and 102). The backgrounds of two camera sub-systems are likely to be appear similar if the cameras are at similar poses. Conversely, the backgrounds of camera sub-systems are likely to appear different if the poses are different, due to different lighting, and the textures of the background surfaces. However, a camera sub-system that is at a very different pose is likely to have an unobstructed view of most of the background pixels that are obstructed in the captured images of the other camera sub-system. Therefore, the background transmitter module 316 gives high relevance to background pixels that are likely to be obstructed by foreground pixels in other camera views. An example of selecting relevant background pixels is described with reference to FIGS. 11A, 11B and 11C.

The method 700 then proceeds to determining step 780, where the cost of transmitting the relevant background pixels is determined under execution of the processor 1505. In the example application of the method 700, the camera sub-systems capture images at high resolution, and at high frame rates. Therefore, a lot of information needs to be transmitted on the network 110. It is therefore advantageous if the number of additional transmitted background pixels be minimised. At determining step 780, therefore, the background transmitter module 316 determines the cost per pixel of transmitting the relevant background pixels to the other camera sub-system (e.g., 102). The cost may be based on the number of camera sub-systems between the current camera sub-system and the other camera sub-system (e.g. there are four camera sub-systems between camera sub-systems 101 and 106).

The method 700 then proceeds to selecting step 790, where the background pixels to transmit are selected under execution of the processor 1505. The background transmitter module 316 selects those background pixels that are highly relevant, and only selects a number of background pixels such that the transmission cost is less than a predetermined threshold. Any other method of determining relevant background pixels, transmission cost, and selecting background pixels to transmit, may be used 790.

The method 700 then proceeds to projecting step 795, where the selected background pixels are projected to the captured image 305 of the other camera sub-system currently being processed. Since, in the example application of the method 700, background pixels lie on the ground plane, step 795 uses the ground plane to perform the projection. The result of step 795 is a set of background pixels, as captured by the current camera, at locations of foreground pixels in the image 305 captured by the other camera sub-system. The other camera sub-system may use the background pixels to update the background model of the other camera sub-system (i.e., as described with reference to FIG. 8), and potentially refine segmentation masks of the other camera sub-system more accurately.

Upon completion of step 795, the method 700 returns to decision step 720. If, at decision step 720, it is determined that there are no more other camera sub-systems, the method 700 concludes. Upon completion of the method 700, the network interface module 315 sends the projected background pixels to their respective other camera sub-systems via the network 110, as described with reference to step 460 of the method 400.

Figure 8:
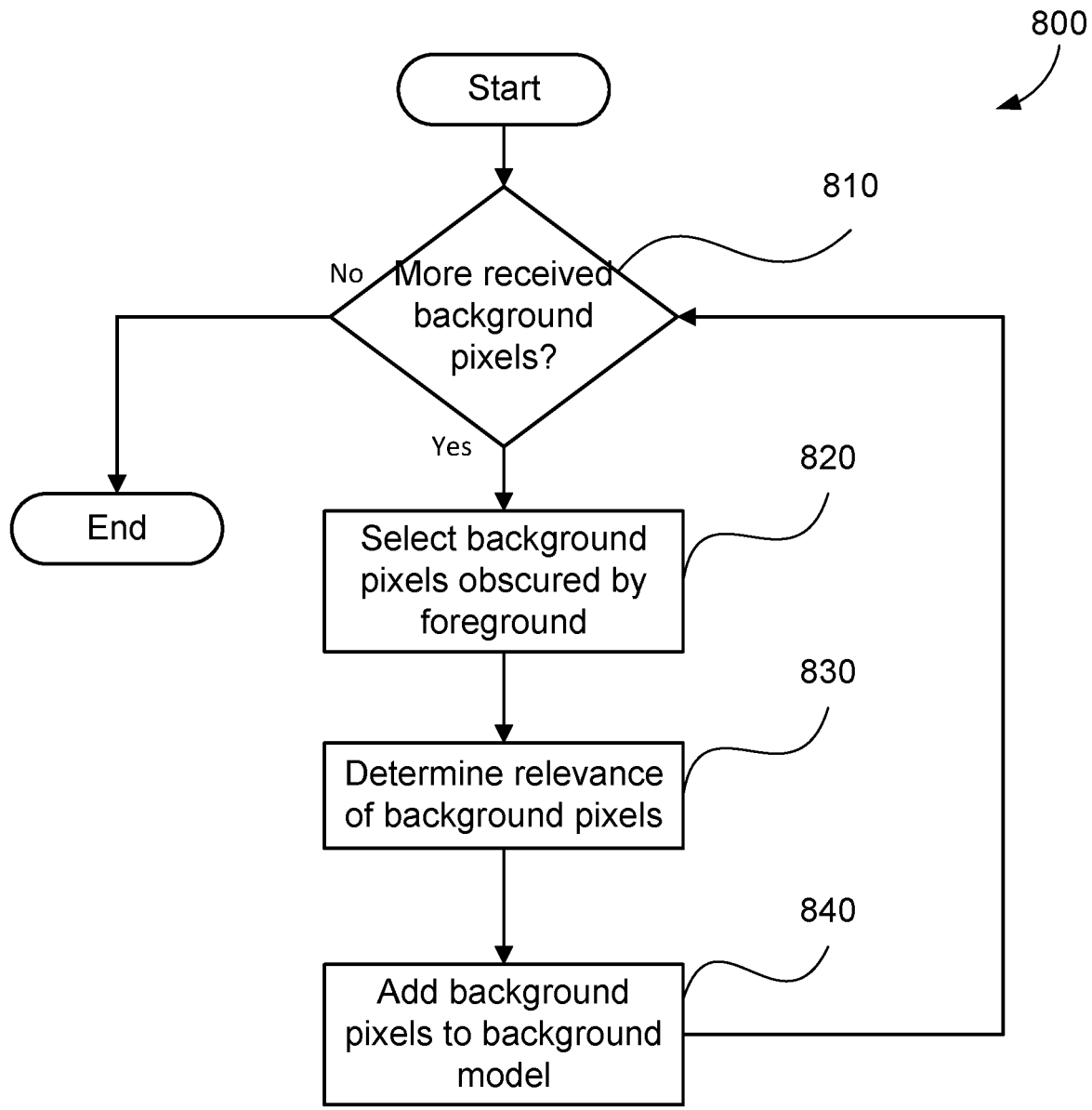
FIG. 8 is a schematic flow diagram showing a method of receiving background pixels from another camera sub-system, and adding the pixels to a background model, as used in the method of FIG. 4.

The method 800 of updating the background model 313 with received pixels, as performed by the background receiver 317, will now be described with reference to FIG. 8. The method 800 is executed at step 480 of the method 400. The method 800 receives the background pixels transmitted to the camera sub-system 101, from other camera sub-systems 102-108, and add the relevant background pixels to the background model 313. In one arrangement, only the background pixels that are obscured by foreground objects are added to the background model 313, since unobscured background pixels are added to the background model 313 by the segmentation refinement component 312.

The method 800 starts at decision step 810, where it is determined if there are more background pixels to process, that have been transmitted by other camera sub-systems (e.g., camera sub-systems 102-108). The background pixels transmitted by each other camera sub-system may be processed separately, and in order of most relevant to least relevant. The background pixels transmitted by another camera sub-system are received by the background receiver module 317 via the network interface 315.

If it is determined at step 810 that there are more received background pixels, then the method 800 proceeds to selecting step 820, where only the received background pixels that are obscured by foreground objects are selected under execution of the processor 150. The remaining received background pixels are discarded. The foreground pixels are may be identified by the initial segmentation 311.

The method 800 then proceeds to determining step 830, where the relevance of the selected background pixels is determined under execution of the processor 1505. In one arrangement, received background pixels that are similar to the background appearance in the captured image 305, at the location of foreground objects, have high relevance, while received background pixels that are dissimilar have low relevance. Background pixels of high relevance are very effective in refining the initial segmentation 311, and are therefore included in the background model 313 by the background receiver module 317. Relevance is determined at step 830 in a similar manner to step 770 of the method 700, as described above. For example, at step 830, relevance may be determined using a pre-determined measure of difference between the backgrounds of the camera sub-system (e.g., camera sub-system 101), and the camera sub-system (e.g., camera sub-system 102) that transmitted the background pixels.

Alternatively, the similarity of the camera poses may be used to determine relevance. For example, it is possible to define normalised vectors from any given 3D location in the scene to the current camera sub-system and the camera sub-system from which the background pixels were transmitted. The normalised vectors may be compared, for example using a dot product, to define the relevance. The 3D location would be determined based on the pixel location in the captured image 305, the assumed geometry and the calibration parameters of the current camera sub-system.

The method 800 then continues to step 840, where the background pixels of high relevance are added to the background model 313. An individual background pixel is only added to the background model 313 if the background pixel has a higher relevance than the background pixel that is already in the background model 313, at the same position. For example, if two other camera sub-systems have transmitted background pixels at overlapping positions in the background model 313, then the most relevant received background pixel is included in the background model 313 at each location. Alternatively, the mean or weighted mean of the background pixels at overlapping positions may be determined, and used to include in the background model 313.

The method 800 then returns to decision step 810. If, at decision step 810, it is determined that there are no more received background pixels, then the method 800 ends. An example of receiving background pixels and updating the background model 313 is described below with reference to FIGS. 11A, 11B and 11C. Upon completion of the method 800, the background model 313 of a particular camera sub-system contains the most relevant background pixels at all positions within a captured image 305. The segmentation refinement module 312 uses the updated background model 313 to produce more accurate, refined segmentation masks 314.

Due to the time taken to transmit background pixels between the camera sub-systems 101-108, the background pixels received by the background receiver module 317 may correspond to a frame captured at an earlier time than the captured image 305 currently being processed. In the example application, the time difference will typically not be an issue, and the received background pixels will still be useful in refining the initial segmentation 311, as performed by the segmentation refinement module 311. In other applications, it may be desirable that only very recent background pixels be added to the background model 313 by the background receiver module 317. In such other applications, a time code may be transmitted with the background pixels, by the background transmitter module 316, so that the background receiver 317 of another camera sub-system can choose to reject the received background pixels if the received background pixels are not recent enough.

As described above, the background transmitter module 316 of a camera sub-system 101 determines the foreground geometry of another camera sub-system (e.g., 102) in the multi-camera system 100, in order to determine which background pixels to transmit to the other camera sub-system. In an alternative arrangement, the other camera sub-system 102 may first transmit a corresponding initial segmentation 311, so that the background transmitter module 316 does not need to determine the foreground geometry. Such an arrangement may result in the transmission of fewer background pixels, with the additional transmission of foreground pixel locations (i.e., initial segmentation 311). In implementations where transmission must occur in single direction 140 on the network 110, the transmission of foreground pixel locations may not be feasible.

In other alternative arrangements, captured images 305 may be segmented into multiple classes of pixels (not only "foreground" and "background"). Further, a different order of processing steps may be used in the method 400 executed by the image segmenter module 302. Still further, different background modelling methods (e.g. Gaussian Mixture Models) and different methods of determining relevant background pixels (e.g. physical closeness of cameras, reprojection error, similarity of camera intrinsic parameters, similarity of exposure settings, similarity of lens specifications, level of occlusion or overlap, and measured similarity of known background pixels) may be used.

In yet another arrangement, the segmentation refinement module 312 may be configured within the central server 120 so that the segmentation refinement as described above is executed by the central server 120. The initial segmentation 311 for each camera may be sent directly to the central server 120, along with background pixels selected in the method 700. The transmitted background pixels may be used to build background models on the server 120. For an arrangement where the segmentation refinement module 312 is configured within and executed by the central server 120 segmentation refinement occurs in a similar way to the previously-described on-camera refinement, using the server background model.

Figure 9A:
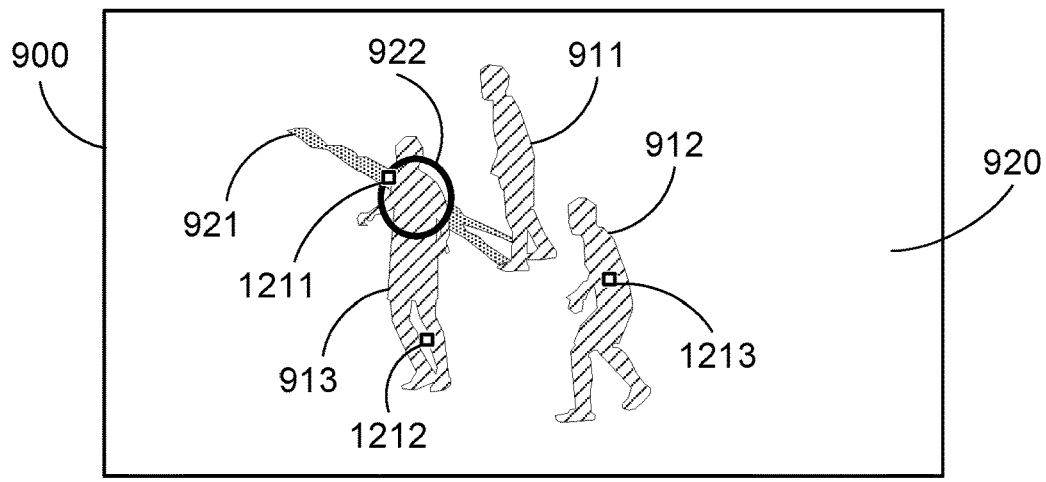
FIG. 9A shows an example of an image captured by one of the camera sub-systems within the example multi-camera system of FIG. 1.

An example of the captured images 305 of a scene 130 captured by three camera sub-systems at the same moment in time will now be described with reference to FIGS. 9A-C. FIG. 9A shows a captured image 900 captured by one camera sub-system 106. The captured image 900 contains three people 911-913, which are considered foreground objects in the current example. The captured image 900 also includes the ground 920 and shadow 921 of person 911, which are considered background in the current example. The people 912 and 913 do not cast a shadow because the people 912 and 913 are in shadow.

Figure 9B:
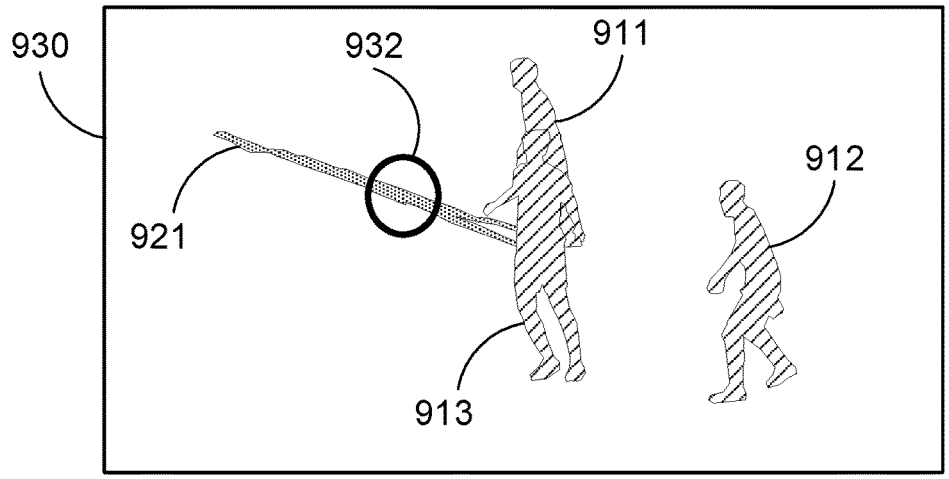
FIG. 9B shows an image of the same scene as FIG. 9A, captured by a different camera sub-system at a similar to location of the camera sub-system used to capture the image of FIG. 9A.

FIG. 9B shows a captured image 930 of the same scene 130, captured by a different camera sub-system 105 at a similar to location to camera sub-system 106. Note that camera sub-systems 105 and 106 are at different locations, so captured image 930 appears different to captured image 900. In particular, captured image 930 contains some regions of the background that are not visible in captured image 900, because the regions are obscured by foreground objects. For example, in captured image 900, the background pixels of the shadow 921 are partially obscured by person 913, at the indicated region 922. However, in captured image 930, the background pixels are visible, at the indicated region 932. The background pixels in region 932 may therefore be useful in refining the segmentation of captured image 900.

Figure 9C:
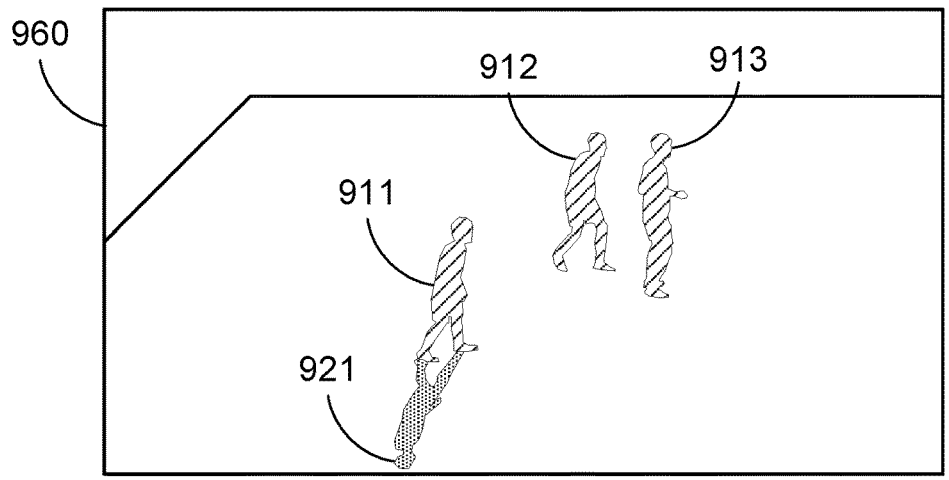
FIG. 9C shows an image of the same scene as FIGS. 9A and 9B, captured by a different camera sub-system that is at a very different pose than the camera sub-systems used to capture the images of FIGS. 9A and 9B.

FIG. 9C shows an additional captured image 960 of the same scene 130. Captured image 906 has been captured by a camera sub-system 101 that is at a very different pose than the camera sub-systems used to capture image 900 and 930. As seen in FIG. 9C most of the background that is obscured in captured image 900 is now visible in captured image 960. However, the appearance of the background may be vastly different, because the pose of camera sub-system 101 is significantly different in the example of FIGS. 9A-9C. Therefore, the background pixels of captured image 960 may not be useful for updating the background model of camera sub-system 106 that captured image 900. Further, there is a large distance between camera sub-systems 101 and 106, so transmitting background information between the two camera sub-systems 101 and 106 across the network 110 may incur a high bandwidth cost.

A rough geometry that the three cameras from which the images of FIG. 9A-9C are captured might, for example, be cameras 106, 105 and 101 of FIG. 1.

Figure 10:
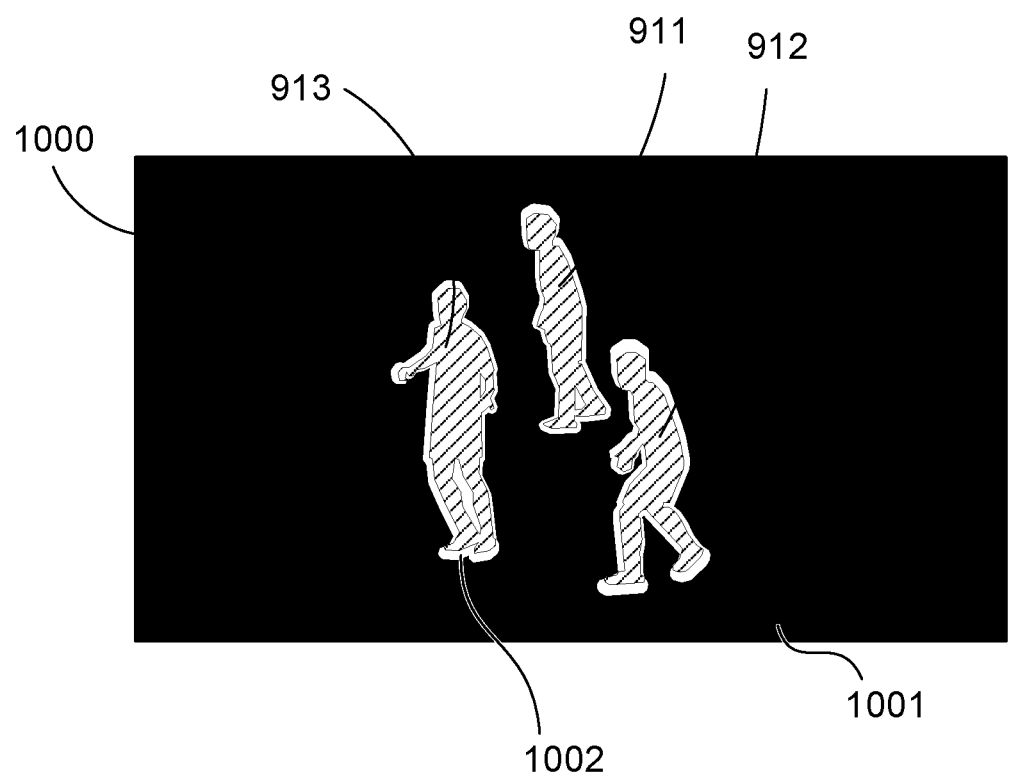
FIG. 10 shows an example of an initial segmentation of the captured image of FIG. 9A.

FIG. 10 shows an example of an initial segmentation 1000 (i.e., segmentation mask) of the captured image 900, as generated by the semantic segmentation module 310, at step 410 of the method 400. The initial segmentation 1000 includes the identification of background pixels 1001 (i.e., coloured "black"), and the identification of foreground pixels 1002 (i.e., coloured "white").

Overlaid on the initial segmentation 1000 are the regions corresponding to three people 911-913 of the captured image 900. Note that the foreground pixels 1002 do not match the pixels of the three people 911-913 precisely. The foreground pixels 1002 do not match because a semantic segmentation method used in the example of FIG. 10, does not produce pixel-perfect segmentation masks. In particular, the foreground pixels 1002 often encompass additional pixels that should be considered background pixels. The described method 400 corrects (i.e., refines) the initial segmentation (e.g. 1000), so that the foreground pixels (e.g. 1002) and background pixels (e.g. 1001) more accurately segment the captured image (e.g. 900).

As described with reference to FIG. 6, the background model 313 may take many different forms. In the arrangement, the background model 313 comprises a single image, with each pixel representing the current known background appearance at the corresponding location in the captured image 305. An example of a background model 313 will now be described with reference to FIGS. 11A-11C. The processes of the method 600 (i.e., corresponding to step 440) and 800 (i.e., corresponding to step 480) of updating the background model 313 were described previously with reference to FIG. 6 and FIG. 8, respectively.

Figure 11A:
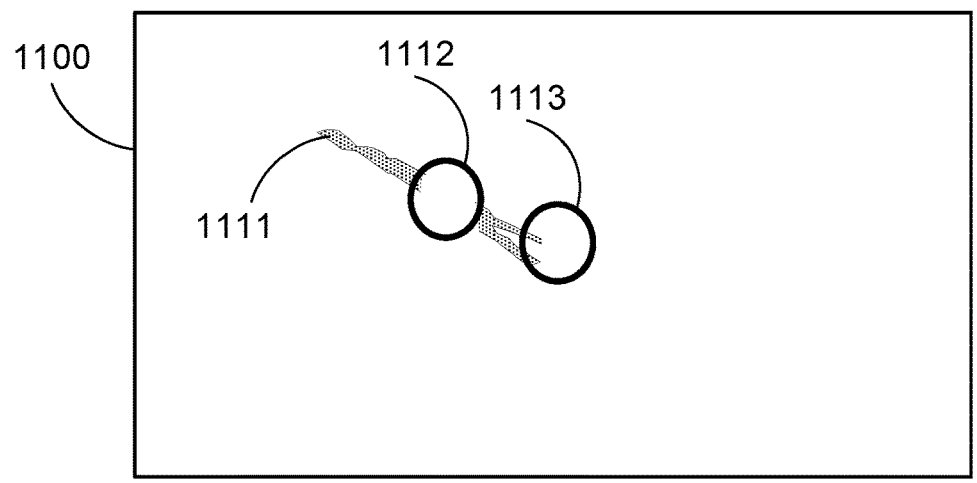
FIG. 11A shows an example of a background model formed by a camera sub-system using only the images 305 captured by a camera of the camera sub-system.

FIG. 11A shows an example background model 1100 formed by camera sub-system 106 using only the captured images 305 captured by a camera (e.g., camera 301) of the camera sub-system 106. In the example of FIG. 11A, the background model 1100 is not formed using background information from other camera sub-systems. Therefore, the background model 1100 also represents a background model obtained, when only using the method 600 to update the background model. The background model 1100 only includes those pixels that have a significant probability of being background. Such pixels include those that are marked by the initial segmentation module 311 or the refined segmentation module 314 as being background. The values of such pixels is set to the corresponding value in the captured image 305. For example, the initial segmentation 1000 specifies that a portion 1111 of the shadow 921 are background pixels, so the background pixels 1100 include the portion 1111 of the shadow. However, the initial segmentation 1000 specifies that the pixels in regions 1112 and 1113 are foreground. Therefore, the background pixels in the regions 1112 and 1113 are not known, or may have changed since the background pixels in the regions 1112 and 1113 were last known with certainty. If the background pixels in the regions 1112 and 1113 are used to refine the initial segmentation 1000, the refined segmentation may still be inaccurate in the regions 1112 and 1113.

Figure 11B:
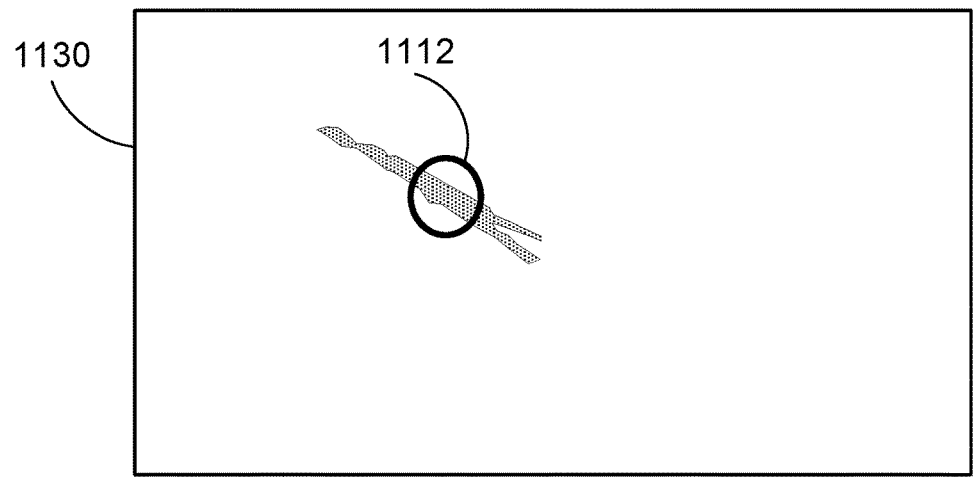
FIG. 11B shows an example updated background model, where the pixels in a region of the background model of FIG. 11A have been updated with the background pixels transmitted by another camera sub-system.

FIG. 11B shows an example updated background model 1130, where the pixels in the region 1112 of previous background model 1100 have been updated with the background pixels transmitted by camera sub-system 105. The process of selecting (including projecting between camera planes) and transmitting background pixels from one camera sub-system to another was described above with reference to FIG. 8. Since camera sub-systems 105 and 106 have very similar poses, the appearance of a background region is very similar in the captured images of both camera sub-systems 105 and 106. Therefore, the selected and transmitted background pixels in region 1112 are useful for refining the initial segmentation 1000 of camera sub-system 106. The selected and transmitted pixels in region 1112, which are received by camera sub-system 106, are added to the background model 313 by the background receiver 317, as described previously with reference to FIG. 8.

Figure 11C:
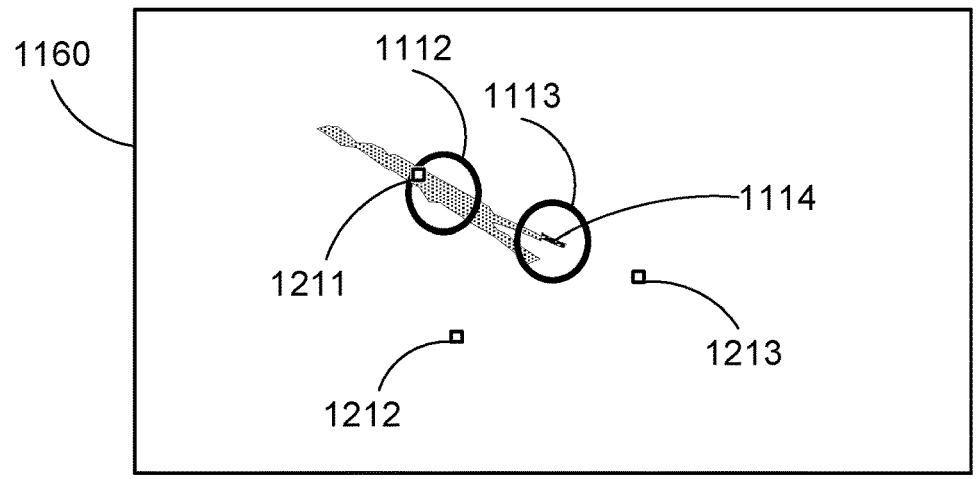
FIG. 11C shows an example updated background model 1160, where the pixels in a region of the background model of FIG. 11B have been updated with the background pixels transmitted by another camera sub-system.

FIG. 11C shows an example updated background model 1160, where the pixels in the region 1113 of previous background model 1130 have been updated with the background pixels transmitted by camera sub-system 101. Since camera sub-systems 101 and 106 have very different poses, the appearance of a background region is likely to be very different in the captured images of both camera sub-systems 101 and 106. Further, due to small inaccuracies in the calculation of camera poses and intrinsic parameters, the projection of background pixels between camera sub-system 101 and 106 may result in small misalignment errors. Such issues are represented in the region 1113 of FIG. 11C by the different appearance and small misalignment of the selected and transmitted background pixels from camera sub-system 101. Therefore, the selected and transmitted background pixels in region 1113 are less useful for refining the initial segmentation 1000 of camera sub-system 106. In particular, the background pixels include a displaced and wrongly coloured part of the shadow of the leg 1114. Therefore, the background receiver module 317, at steps 830-840 of the method 800, may only include those received background pixels in region 1113 in the background model 1160 that are not already included (or have not been updated for a long time, for example).

In the example of FIGS. 11A to 11C, the updated background model 1160 is used to refine the segmentation of a captured image.

Figure 12A:
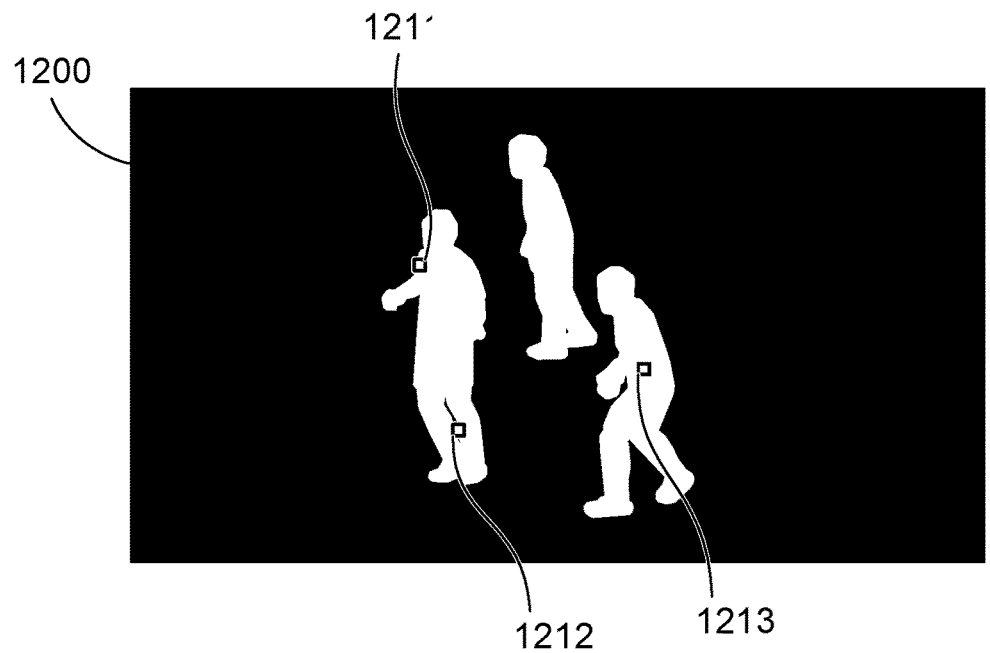
FIG. 12A shows an example initial segmentation of the image of FIG. 9A.
Figure 12B:
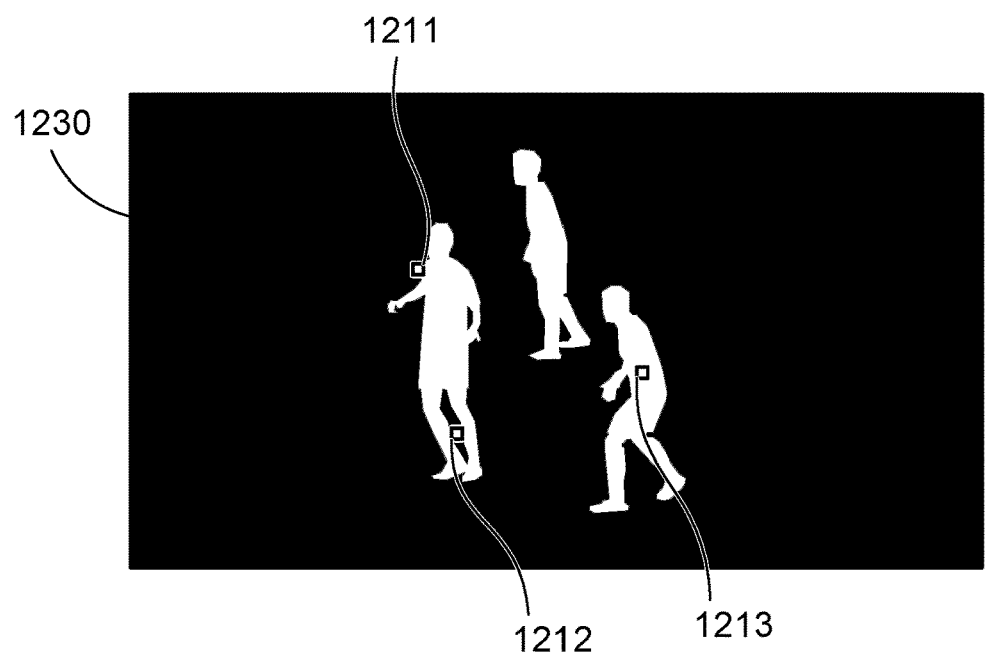
FIG. 12B shows an example of the segmentation of FIG. 12A after being refined.

An example of refining an initial segmentation 311, as performed by the segmentation refinement module 312, at step 420 of the method 400, will now be described with reference to FIGS. 12A and 12B. FIG. 12A shows an example initial segmentation 1200 (segmentation mask) of the captured image 900, as generated by the semantic segmentation module 310, at step 410 of the method 400. The initial segmentation 1000 includes the identification of background pixels 1001 (coloured "black"), and the identification of foreground pixels 1002 (coloured "white"). The initial segmentation 1200 is not an accurate segmentation of the foreground objects in captured image 900, and therefore undergoes refinement by the segmentation refinement component 312.

As described with reference to FIG. 5, the segmentation refinement process preferably entails comparing each pixel in the captured image 900 that is marked as "foreground" by the initial segmentation 1200 with the corresponding pixel in the background model 1160. Three pixels 1211-1213 that are marked as foreground in the initial segmentation 1200 are shown in FIG. 12A. The pixels 1211-1213 are also shown overlaid on the captured image 900 of FIG. 9A, and the background model 1160 of FIG. 11C.

As shown in FIG. 9A, foreground pixel 1211 in the captured image 900 has the appearance of the shadow 921. As shown in FIG. 11C, the background model 1160 has the same appearance at the location of foreground pixel 1211 as the captured image 900. Therefore, at step 540 of the method 500, when the captured image 900 is compared with the background model 1160, at the location of foreground pixel 1211, the captured image 900 and background model 1160 will be determined to be very similar (i.e., both the captured image 900 and background model 1160 will have the appearance of the shadow 921). Therefore, at step 560 of the method 500, foreground pixel 1211 will be corrected, and the refined segmentation 1230 (i.e., shown in FIG. 12B) is labelled "background" at the pixel 1211.

Similarly, as shown in FIG. 9A, foreground pixel 1212 in the captured image 900 has the appearance of the ground 920. As shown in FIG. 11C, the background model 1160 has the same appearance at the location of foreground pixel 1212 as the captured image 900. Therefore, at step 540 of the method 500, when the captured image 900 is compared with the background model 1160, at the location of the foreground pixel 1212, the captured image 900 and the background model 1160 will be determined to be very similar (i.e., both the captured image 900 and the background model 1160 will have the appearance of the ground 920). Therefore, at step 560 of the method 500, foreground pixel 1212 will be corrected, and the refined segmentation 1230 (i.e., as shown in FIG. 12B) is labelled "background" at the pixel 1212.

However, as shown in FIG. 9A, foreground pixel 1213 in the captured image 900 has the appearance of the person 912. As shown in FIG. 11C, the background model 1160 has a different appearance to the background model 1160, at the location of foreground pixel 1213, as the background model 1160 contains the appearance of the ground 920. Therefore, at step 540 of the method 500, when the captured image 900 is compared with the background model 1160, at the location of foreground pixel 1213, the captured image 900 and the background model 1160 will be determined to be different. Therefore, foreground pixel 1212 will not be corrected, and the refined segmentation 1230 (i.e., as shown in FIG. 12B) is labelled "foreground" at this pixel 1213.

It is desirable that an accurate background model be generated, so that the segmentation refinement module 312 can produce an accurate refinement segmentation. However, if, for example, person 913 has remained stationary for a long time, the corresponding background pixels may not be accurate. In particular, the shadow 921 may have moved, drastically changing the appearance of the background behind person 913. Furthermore over time the stationary foreground image pixels may be confused as background and used to update the background. The described method 400 addresses the issue of foreground image pixels being confused as background, by selecting and transmitting background pixels from a different camera sub-system, at the appropriate positions. As a result, the background model 313 is accurate, for the camera sub-system (e.g., 101) currently performing segmentation. For example, camera sub-system 105 will select background pixels of a captured image 930 to transmit to camera sub-system 106. The background receiver module 317 of camera sub-system 105 may then include the background pixels in the background model 313 determined for the camera sub-system 105.

Figure 13A:
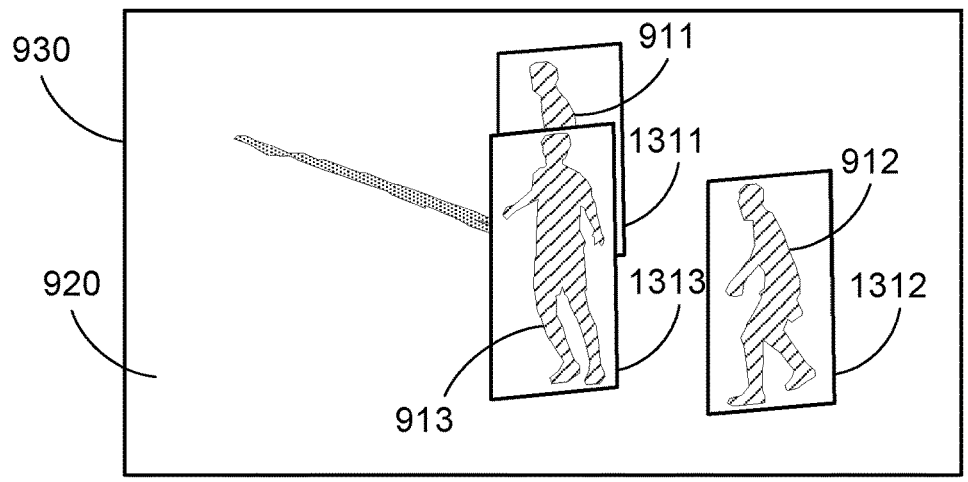
FIG. 13A shows an example of an image captured by a camera sub-system of the network of FIG. 1.
Figure 13B:
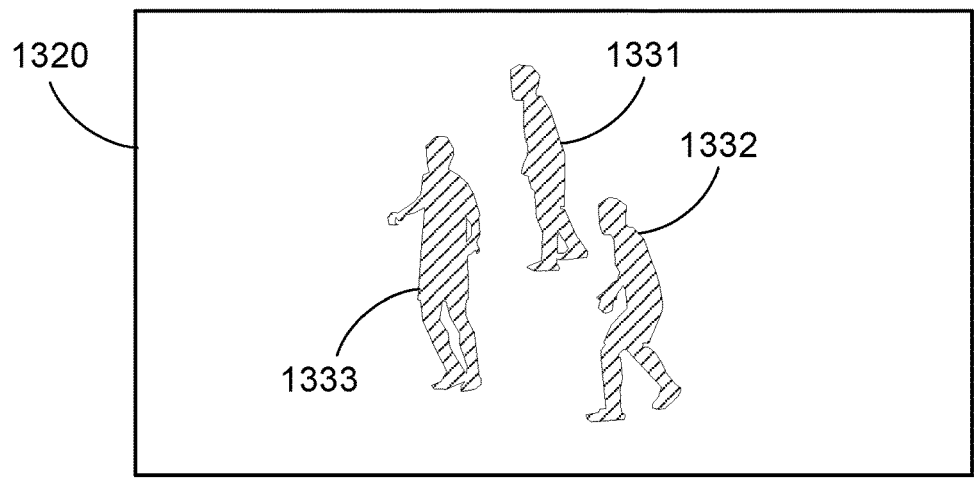
FIG. 13B shows foreground pixels on an image plane of a camera sub-system, corresponding to the captured image of FIG. 13A currently being segmented.
Figure 13C:
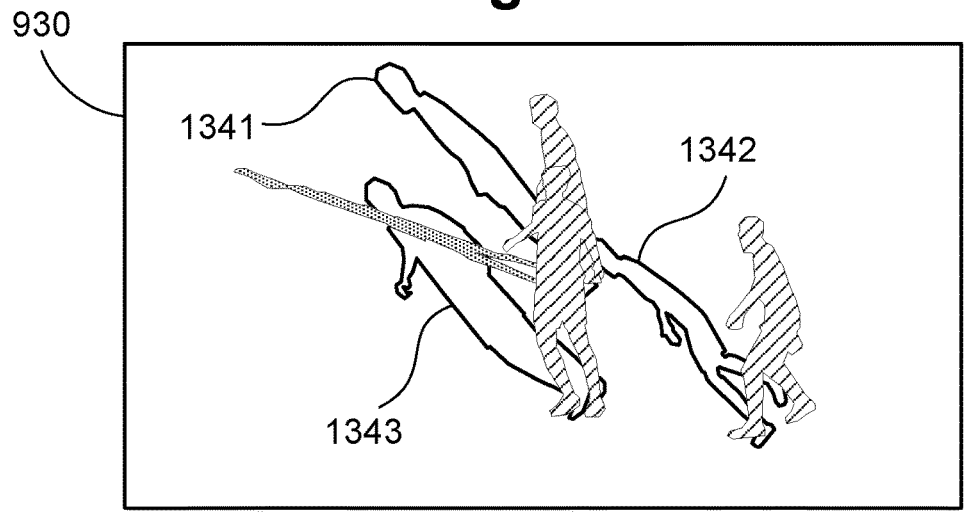
FIG. 13C shows the foreground pixels of FIG. 13B projected onto the image plane of a camera sub-system, via the ground plane, and overlaid with the captured image of FIG. 13A.

An example of selecting background pixels to transmit, as performed by the background transmitter module 316, at step 450 of the method 400, will now be described with reference to FIGS. 13A, 13B and 13C. In the example of FIGS. 13A, 13B and 13C, the captured image 900 is being segmented. The example of FIGS. 13A, 13B and 13C corresponds to the method 700 as described above.

FIG. 13A shows the captured image 930, captured by camera sub-system 105. Overlaid on the captured image 930 in FIG. 13A are the planes 1311-1313, corresponding to the three people 911-913, respectively. The planes 1311-1313 are two-dimensional planar (flat) surfaces in three dimensional (3D) space, commonly described mathematically by a 3D point that the plane intersects, and the normal vector of the plane. In the described method 700, the planes 1311 are used to project the locations of the foreground objects 911-913 from the image plane of camera sub-system 105 to the image plane of camera sub-system 106. Therefore, the planes 1311-1313 pass through the location of their respective foreground objects 911-913 on the ground, and are aligned with the main axis of the foreground objects 911-913. In the example application, where foreground objects 911-913 are people who are predominantly standing, walking, running, etc., the planes 1311 are vertical. The planes 1311-1313 are also angled between the two camera sub-systems 105 and 106, so that the image plane points may be projected with minimal error. In alternative arrangement, other geometric constructs, such as cylinders, may be used in the place of planes.

FIG. 13B shows the determined foreground pixels 1331-1333 on image plane 1320 of camera sub-system 106, corresponding to the captured image 900 currently being segmented. The foreground pixels 1331-1333 are determined by projecting the pixels belonging to foreground objects 911-913 to image plane 1320 via planes 1311-1313, respectively. The projection between camera image planes, calibrated cameras with known poses, and a plane, was described previously with reference to FIG. 7. Note that estimated foreground pixels 1331-1333 are only an approximation of the foreground pixels of the captured image of camera sub-system 106, since the foreground pixels 1331-1333 are projected from planes 1311-1313, rather than the true 3D geometry of foreground objects 911-913. Further, the latency in determining and transmitting background pixels means there is some error in the determined foreground pixels 1331-1333. Therefore, the determined foreground pixels 1331-1333 may also be dilated (i.e., the regions expanded), as described with reference to the method 700 of FIG. 7.

FIG. 13C shows the foreground pixels 1331-1333 projected onto the image plane of camera sub-system 105, via the ground plane, and overlaid with captured image 930. The projected foreground pixels 1331-1333 result in determined background pixels 1341-1343, which consist of predominantly background pixels in the captured image 930. The background pixels 1341-1343 do not correspond to the foreground objects 911-913, and will therefore be useful for updating the background model 313 of camera sub-system 106, and refining the segmentation of captured image 900. After selecting background pixels 1341-1343, the background transmitter module 316 will project the background pixels 1341-1343 to the image plane 1320 via the ground plane, and transmit the projected background pixels to camera sub-system 106.

As seen in FIG. 13C, background pixels 1343 includes the shadow at region 932. Therefore, if the shadow at region 932 changes, while person 913 remains stationary, the background model of camera sub-system 106 will include the shadow at the latest pixel locations. Camera sub-system 106 will therefore produce a potentially more accurate segmentation at the location of the shadow. However, the shadow may be only approximately correct, due to movement, network transmission lag, and other synchronisation issues.

The determined background pixels 1341-1343 shown in FIG. 13C also include foreground pixels of people 911-913. In one arrangement, the foreground pixels are excluded from the background pixels transmitted by the background transmitter modules 316. The foreground pixels of people 911-913 included in the background pixels 1341-1443 are preferably identified by the initial segmentation 311.

In one arrangement, all background pixels 1341-1343 (excluding foreground pixels) are transmitted by the background transmitter module 316, where the background is likely to be very similar to the background of the captured image being segmented. In the example of FIGS. 13A-13C, camera sub-systems 105 and 106 are physically very close to each other, and are therefore likely to have very similar background appearance, at corresponding background positions. However, camera sub-system 101 (with example captured image shown in FIG. 9C) is at a very different pose to camera sub-system 106. Therefore, the background pixels generated by the sub-system 101 and 106 are likely to be different at corresponding background locations. Therefore, camera sub-system 101 may only select and transmit those background pixels that are likely to be obscured in other cameras. For example, since camera sub-systems 105 and 106 have similar poses, many background pixels near the feet of people are obscured in both captured images, while the corresponding pixels are visible in the captured image of camera sub-system 101.

Figure 14A:
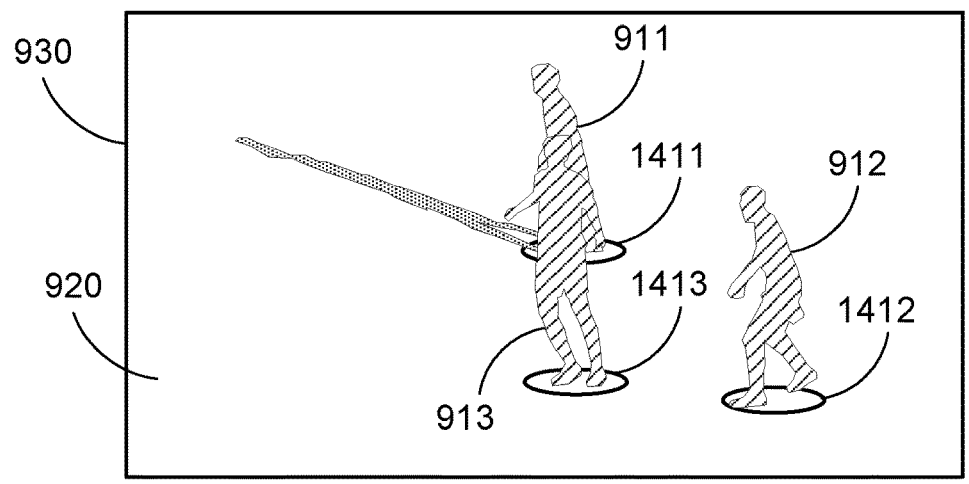
FIG. 14A shows an example an image captured by a camera sub-system of the network of FIG. 1.
Figure 14B:
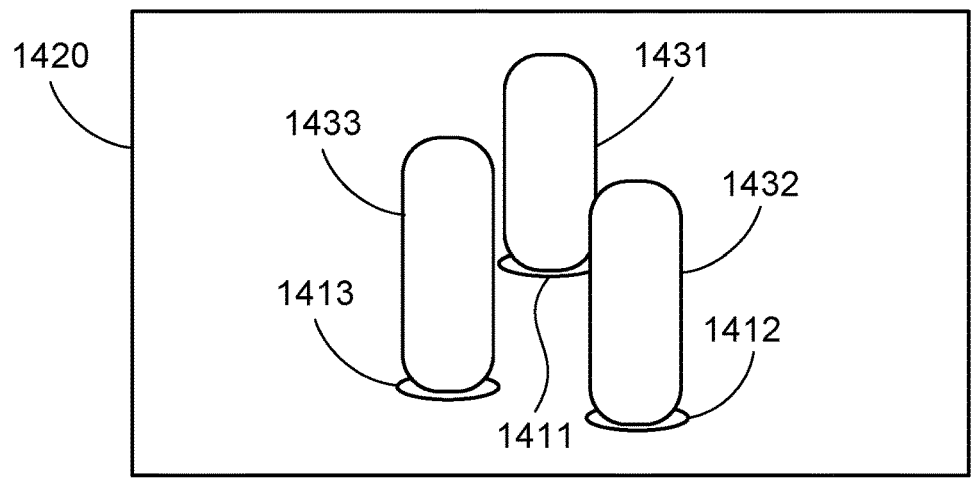
FIG. 14B shows locations of foreground pixels on an image plane of a camera sub-system, corresponding to the captured image of FIG. 14A currently being segmented.
Figure 14C:
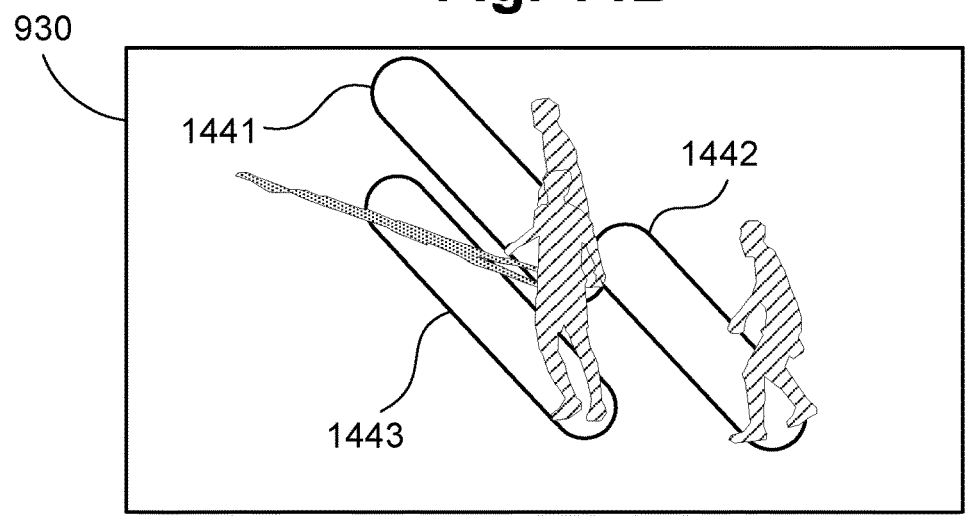
FIG. 14C shows the foreground pixels of FIG. 14B projected onto the image plane of a camera sub-system, via the ground plane, and overlaid with the captured image of FIG. 14A.

A second example of selecting background pixels to transmit, as performed by the background transmitter module 316, at step 450 of the method 400, will now be described with reference to FIGS. 14A to 14C. In the example of FIGS. 14A to 14C, the captured image 900 is being segmented. The example of FIGS. 14A to 14C corresponds to an alternative arrangement of the method 700.

FIG. 14A shows the captured image 930, captured by camera sub-system 105. Overlaid on the captured image 930 in FIG. 14A are locations 1411-1413 of the three people 911-913 on the ground 920. The locations 1411-1413 may be determined using various methods. In one arrangement, the locations 1411-1413 are determined by locating a lowest position of each segmented foreground object. Since, in the example application, foreground objects consist of people, who are of known size and geometry, and are usually standing on the ground, the locations 1411-1413 may be determined with some accuracy. The determination of the locations of foreground objects was described previously with reference to step 710 of the method 700.

FIG. 14B shows the determined locations 1411-1413 projected onto the image plane 1420 of the camera sub-system 106, corresponding to the captured image 900 currently being segmented. The projection between camera image planes, calibrated cameras with known poses, and a ground plane, was described previously with reference to FIG. 7.

Also shown in FIG. 14B is determined foreground pixels 1431-1433 in the image plane 1420 of camera sub-system 106. Since, in the example application, foreground objects consist of people, which are of known size and geometry, and are usually standing on the ground, the determined foreground pixels 1431-1433 may be determined with some accuracy. The determined foreground pixels 1431-1433 do not need to be precise. The determined foreground pixels (e.g, 1431-1433) only need to identify a majority of foreground pixels, so that corresponding background pixels may be determined. The determination of foreground pixels was described previously with reference to FIG. 7.

FIG. 14C shows the determined foreground pixels 1431-1433 projected onto the image plane of camera sub-system 105, and overlaid with captured image 930. The projected foreground pixels 1431-1433 result in determined background pixels 1441-1443, which consist of predominantly background pixels in the captured image 930. The determined background pixels 1441-1443 do not correspond to the foreground objects 911-913, and will therefore be useful for updating the background model 313 of camera sub-system 106, and refining the segmentation of captured image 900. After selecting background pixels 1441-1443, the background transmitter module 316 will transmit the background pixels 1441-1443 to camera sub-system 106.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of segmenting an image of a scene captured using one of a plurality of cameras in a network, the method comprising:
   receiving a mask of an image of a scene captured by a first one of said cameras;
   determining a set of pixels in the mask likely to be in a foreground of an image captured by a second one of said cameras based on the received mask, calibration information, and a geometry of the scene;
   generating a set of background pixels for the second camera based on the determined set of pixels;
   transmitting the generated set of background pixels to the second camera; and
   segmenting the image of the scene captured by the second camera using the transmitted background pixels.

2. The method according to claim 1, wherein generating the set of background pixels uses a further image of the scene captured by the first camera.

3. The method according to claim 1, wherein the second camera is selected from the plurality of cameras based on similarity with respect to the first camera.

4. The method according to claim 3, wherein similarity is further based on background pixels, similarity of views between the cameras.

5. The method according to claim 1, wherein the generated set of background pixels is transmitted at lower resolution for one or more image frames.

6. The method according to claim 1, wherein scene geometry includes a ground plane associated with the scene.

7. The method according to claim 1, wherein the second camera is selected to transmit the generated set of background pixels based on a weight of the background pixels.

8. The method according to claim 1, wherein the weight of the background pixels is based on a similarity measure.

9. A system for segmenting an image of a scene captured using one of a plurality of cameras in a network, the system comprising:
- a memory for storing data and a computer program;
- a processor coupled to the memory for executing the computer program, the program comprising instructions for:
- receiving a mask of an image of a scene captured by a first one of said cameras;
- determining a set of pixels in the mask likely to be in a foreground of an image captured by a second one of said cameras based on the received mask, calibration information, and a geometry of the scene;
- generating a set of background pixels for the second camera based on the determined set of pixels;
- transmitting the generated set of background pixels to the second camera; and
- segmenting the image of the scene captured by the second camera using the transmitted background pixels.

10. An apparatus for segmenting an image of a scene captured using one of a plurality of cameras in a network, the apparatus comprising:
- means for receiving a mask of an image of a scene captured by a first one of said cameras;
- means for determining a set of pixels in the mask likely to be in a foreground of an image captured by a second one of said cameras based on the received mask, calibration information, and a geometry of the scene;
- means for generating a set of background pixels for the second camera based on the determined set of pixels;
- means for transmitting the generated set of background pixels to the second camera; and
- means for segmenting the image of the scene captured by the second camera using the transmitted background pixels.

11. A non-transitory computer readable medium for segmenting an image of a scene captured using one of a plurality of cameras in a network, the program comprising:
- code for receiving a mask of an image of a scene captured by a first one of said cameras;
- code for determining a set of pixels in the mask likely to be in a foreground of an image captured by a second one of said cameras based on the received mask, calibration information, and a geometry of the scene;
- code for generating a set of background pixels for the second camera based on the determined set of pixels;
- code for transmitting the generated set of background pixels to the second camera; and
- code for segmenting the image of the scene captured by the second camera using the transmitted background pixels.

* * * * *